United States Patent [19]

Marumoto et al.

[11] Patent Number: 5,231,344
[45] Date of Patent: Jul. 27, 1993

[54] CONTROL APPARATUS FOR ELECTRIC GENERATOR

[75] Inventors: Katsuji Marumoto; Kunio Miyashita; Kazuo Tahara, all of Hitachi; Keiichi Mashino, Katsuta; Atsushi Kanke, Hitachi; Akihiro Saito, Katsuta, all of Japan

[73] Assignee: Hitachi Ltd., Tokyo, Japan

[21] Appl. No.: 917,734

[22] Filed: Jul. 20, 1992

Related U.S. Application Data

[63] Continuation of Ser. No. 638,446, Jan. 4, 1991.

[30] Foreign Application Priority Data

Jan. 17, 1990 [JP] Japan .................................. 2-6123

[51] Int. Cl.⁵ .................................. H02J 7/14
[52] U.S. Cl. .................................. 322/14; 320/25
[58] Field of Search .................................. 322/14–16, 322/19, 32, 58, 73, 100; 320/25; 361/20, 21, 110, 111

[56] References Cited

U.S. PATENT DOCUMENTS

| | | | |
|---|---|---|---|
| 4,258,307 | 3/1981 | Mori et al. | 322/28 |
| 4,275,344 | 6/1981 | Mori et al. | 322/28 |
| 4,351,405 | 9/1982 | Fields et al. | 180/65 A |
| 4,623,833 | 11/1986 | Edwards | 322/28 |
| 4,636,705 | 1/1987 | Bowman | 322/28 |
| 4,651,081 | 3/1987 | Nishimura et al. | 322/14 |
| 4,673,851 | 6/1987 | Disser | 318/341 |
| 4,680,529 | 7/1987 | Komurasaki et al. | 322/28 |
| 4,689,545 | 8/1987 | Komurasaki et al. | 322/14 |
| 4,914,374 | 4/1990 | Iwatani et al. | 322/28 |
| 4,928,220 | 5/1990 | White | 363/21 |
| 4,940,928 | 7/1990 | Nishimura | 322/28 |
| 4,983,895 | 1/1991 | Koharagi et al. | 318/254 |
| 4,992,920 | 2/1991 | Davis | 322/32 |

FOREIGN PATENT DOCUMENTS

0289608 11/1988 European Pat. Off. .
1040673 5/1964 United Kingdom ................ 322/73
1431765 4/1976 United Kingdom ................ 322/20
2013337 8/1979 United Kingdom .

OTHER PUBLICATIONS

Patent Abstracts of Japan, vol. 10, No. 367 (E-462)(2424) Dec. 9, 1986, & JP-A-61 161999 (Hitachi) Jul. 22, 1986.
Technische Mitteilungen Aeg Telefunken, vol. 68, No. 1, Apr. 1978, Berlin DE pp. 57-66; R. Gerlach.
Patent Abstracts of Japan, vol. 8, No. 185 (E-262)(1622) Aug. 24, 1984, & JP-A-59 076198 (Nippon Denso K.K.) May 1, 1984.

Primary Examiner—Steven L. Stephan
Assistant Examiner—Thomas M. Dougherty
Attorney, Agent, or Firm—Ladas & Parry

[57] ABSTRACT

A control device for an electric generator for use with a vehicle engine includes an armature winding (stator) and a field winding (rotor) driven by the vehicle engine. A chopper is provided for controlling the field current of the field winding and a pulse width modulator is provided for controlling the duty cycle of the chopper in response to the operating conditions of the engine. A voltage feedback loop is provided from a normally provided battery which loop incorporates a detector for detecting the actual battery voltage and a comparator for comparing the battery voltage with a predetermined set voltage so that the difference in voltage is rendered to zero. The invention additionally provides a current feedback loop for controlling a deviation between a current command value determining the duty of the chopper and an actual current flowing through the field winding so as to be substantially zero. There is also disclosed means for adaptively modifying the current command signal and means for controlling the current demanded by the field winding to reduce the torque demanded by the generator at times, inter alia, of acceleration and engine knocking.

23 Claims, 15 Drawing Sheets

Fig.24(1) POWER GENERATION STOP FET₁ DISCONNECTION WINDING DISCONNECTION — LIGHT ON

Fig.24(2) OVER VOLTAGE — LIGHT ON / LIGHT OFF

Fig.24(3) B TERMINAL OPEN

Fig.24(4) S TERMINAL OPEN

Fig.24(5) OVER VOLTAGE +B TERMINAL OPEN

Fig.24(6) OVER VOLTAGE +S TERMINAL OPEN

Fig.24(7) B TERMINAL OPEN +S TERMINAL OPEN

Fig.24(8) OVER VOLTAGE +B TERMINAL OPEN +S TERMINAL OPEN 0.25 SECOND (POWER GENERATION CUT)

CONTROL APPARATUS FOR ELECTRIC GENERATOR

This is a continuation of copending application Ser. No. 07/638,446 filed on Jan. 4, 1991.

BACKGROUND OF THE INVENTION a) Field of the Invention

This invention relates to a control device for an electric generator (such as an alternator) for use with a vehicle engine. In preferred embodiments, this invention relates to a control device in which a generator field winding current is controlled in response to an electric load condition or, when used with an automobile, to an operating condition of the automobile.

b) Description of Related Art

It is known from JP-A-59-76198 (1984) to provide a control device for an electric generator in which the field current is controlled so that the output voltage of the generator reaches a target voltage determined in response to a load.

Further, JP-A-55-29222 (1980) discloses detecting the field current of a generator and controlling the field current to reach a predetermined value.

It is also known from JP-A-59-83600 (1984) that during a sudden load change a voltage command value may be changed in a step toward a target voltage to change the generator field current also in a step.

Moreover, JP-B-1-56617 discloses the use of a microcomputer to optionally control the power generation condition of a generator in response to, for example, the load condition and the battery condition of a vehicle.

In the above-mentioned JP-A-59-76198 (1984), the field current is controlled in an open-loop manner, but a problem arises in that the variation of the field current due to, for example, the condition of the current supply source and the resistance change of a field coil, is uncontrollable. Namely, there is a problem, in that, even if there is no change in the target voltage, the target voltage cannot be maintained if the field current change due to, for example, a change in the field winding resistance caused by ambient temperature change and increase in field winding temperature.

In the above noted JP-A-55-29222 (1980), although the field current is feedback-controlled, the feedback control is effected so that the output voltage of the generator is always kept at a predetermined value, but such is inapplicable to obtaining output voltage control in response to a load variation. Further, in this reference, because the field current is detected by a current transformer, there is a problem, in that, it is unsuitable for forming the circuit into an integrated circuit (IC).

In JP-A-59-83600 (1984), the control ratio is limited near a practical output voltage value of the generator and a comparatively broad band level of control cannot be obtained. In this respect, this known device is only effective to abruptly change the generator torque, by cutting the generator field current off. Therefore, the problem exists that the torque variation to drive the generator cannot be adequately controlled. Thus, when a large resistance load such as an air-conditioner is switched on, the power required from the generator suddenly increases, resulting in increase in the torque required to drive the generator which, in an automobile, increases the torque requirement from the internal combustion engine. If the engine is running at idling speed, the increase in torque required to drive the generator can stall the engine. In other words, the load increase occurs too suddenly for the fuel-injection system of the engine to react to increase the amount of fuel required to drive the engine to satisfy the torque required to drive the generator. In the prior art reference, the alternator torque is suddenly increased in one step leading to possible stalling of the automobile engine. Further, in this reference and JP-B-1-56617 when power generation is required to be controlled in response to the load condition and the battery condition of a vehicle, there is a problem in that the required control cannot be achieved as required because of internal factors within the disclosed circuits, such as change of the field coil resistance.

The present invention seeks to overcome the foregoing disadvantages.

An object of the present invention is to enable the output voltage of a generator to be controlled over a broad range in response to changing load by feedback-control of the field winding current and so that the field winding current is not affected by the condition of the current supply (battery) source or the resistance change of the field coil.

A further object of a feature of the present invention is to effectively lessen variation in the torque required to drive the generator with variation of load.

Still another object of a further feature of the present invention is to precisely control the field current according to the power generation condition in response to the load condition and the battery condition of the vehicle.

SUMMARY OF THE INVENTION

According to this invention there is provided a control apparatus for an electric generator having an armature winding and a field winding adapted to be driven by an engine of a vehicle, said apparatus including a chopper for controlling the field current of said field winding and pulse width control means for controlling the duty of said chopper in response to the operating condition of the engine characterised by means for controlling a deviation between a current command value determining the duty of the chopper and an actual current flowing through the field winding so as to be substantially zero.

Thus, the present invention determines a field current command value in response to a condition of load which is connected to a generator, and based upon this current command value and an actual field current controls a chopper used for field current control.

Preferably, the means for controlling a deviation include comparator means for determining the deviation between a battery voltage of the vehicle and a predetermined voltage.

Advantageously, means are provided for adaptively controlling the output of the deviation determining means on a priority level basis with output signals generated by at least one of a means arranged to determine rotational speed of the field winding, an electrical load responsive circuit and a temperature detection circuit adapted to detect the temperature of the chopper.

Conveniently, during an OFF period of the chopper, the conduction ratio of the chopper is determined based upon the field winding current value immediately before the chopper OFF period.

For achieving the above further object, preferably during a change in load, the command value of the field winding current is gradually brought to a target current and the field current is feedback-controlled based upon the actual field current and the current command value.

Also, for achieving the above still another object, advantageously the command value of the field winding current is obtained in response to the load condition and the battery condition of the vehicle and in response thereto, the field current power generation condition is controlled.

In the present invention the output voltage of the generator is controlled at an optimum output voltage in response to the load requirement even when there are changes due to the condition of the field current supply source and the temperature of the field winding resistance. Namely, when the load changes, in correspondence therewith, the output voltage of the generator is controlled, and when the load does not change but a current variation occurs, the current supplied by the generator is automatically controlled to be maintained at a target value.

In the present invention, the chopper current is detected without using a current transformer so that the current detection circuit may readily be formed into an IC.

In use of the present invention, while carrying out the feedback control for the field current, the field current command value may be gradually changed toward the target current value so that a smooth control over a broad current range from zero to the maximum current value is enabled without abrupt field current change and also irrespective of the amount of field current variation.

Still further, by use of this invention there is no change in the field winding current due to the internal factors in the circuit, so the power generation condition may be precisely controlled in response to the operating condition and the battery condition of a vehicle.

According to a feature of this invention there is provided field current control means for controlling the field current through a field winding of the generator. The field winding is arranged to charge a battery in dependence upon a deviation voltage between a battery voltage ($V_{Bd}$) and a predetermined voltage ($V_{BC}$) such that the battery voltage is maintained at the predetermined voltage. The field current control means comprises field current signal generating means (B) for generation a signal ($I_{ff}$) in response to current flowing through said field winding, current command value generating means (A) for providing a field winding current command value ($I_{fo}$) that is necessary for maintaining said battery voltage at said predetermined voltage, deviation determining means for providing an output signal ($\epsilon_1$) in dependence upon deviation between said signal ($I_{ff}$) from the current signal generating means (B) and the field winding current command value ($I_{fo}$) which output signal ($\epsilon_1$) is adapted to, be applied to a field winding current supply means (C). The field current supply means being adapted to provide a predetermined current to said field winding.

BRIEF DESCRIPTION OF THE DRAWINGS

The invention will now be described, by way of example, with reference to the accompanying drawings in which.

In the Figures like reference numerals denote like parts.

The present invention is explained hereinbelow with regard to an exemplary embodiment applied to the control of an electric generator (alternator) used for an automobile.

Figure 1:
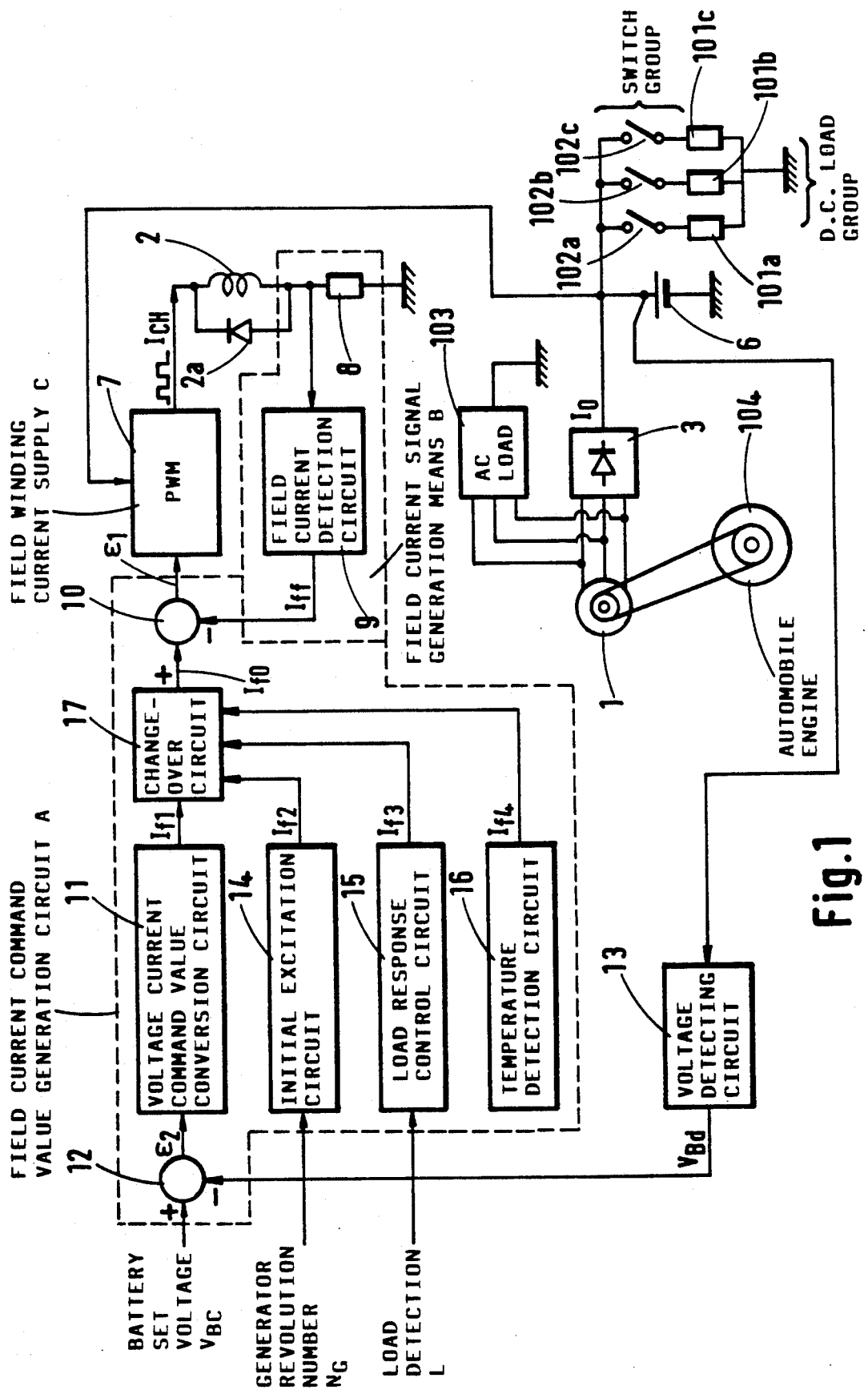
FIG. 1 is a block circuit diagram of a major part of a control device in a charging generator for use with an automobile in accordance with this invention.

An electric generator 1 shown in FIG. 1 for an automobile, has many different kinds of loads connected thereto such as a battery 6, used as a direct current power source, direct current loads 101a, 101b, 101c switched, for example, by respective switches 102a, 102b, 102c for which the battery is a power source and an alternating current load 103 which uses the alternating current output of the generator 1 as a power source. Of course, the battery 6 is itself one of the loads of the generator 1.

Examples of loads 101a, 101b, 101c are an air conditioner, a lighting system, audio apparatus, and an electromagnetic device used for fuel control. Further, a load is sometimes connected to the alternating current output of the generator as a direct power load. An example is a windshield de-frosting system which quickly melts ice formed on the windshield.

The generator 1 is driven by the engine 104 of the automobile and outputs a three phase alternating current. This alternating current is rectified by a rectifier 3 and is supplied to the battery 6.

The generator 1 includes a field winding 2 which is controlled by controlling the current flowing therethrough so that a sufficient output voltage of the generator is obtained in order to maintain the battery voltage at a predetermined value. A flywheel diode 2a is connected in parallel with the field winding 2.

The control of the field winding current will now be explained.

The voltage of the battery 6 is detected by a voltage detecting circuit 13 and a signal $V_{Bd}$ is compared in a comparator 12 with a battery set voltage (14.6±0.25 V) $V_{BC}$, the deviation thereof being amplified and outputted as a voltage deviation signal $\epsilon_2$.

In response to the voltage deviation signal $\epsilon_2$ a voltage-current instruction value conversion circuit 11 outputs a current command value $I_{f1}$ corresponding to a target field current which is necessary to maintain the battery voltage at a predetermined value.

A change over circuit 17 determines which of a number of current command values $I_{f2}$-$I_{f4}$ are to be selected and outputted as a target field current command value $I_{f0}$. In this respect the current command values are $I_{f2}$ derived from an initial excitation circuit 14 to be explained herein below, a current command value $I_{f3}$ derived from a load response control circuit 15, or a current command value $I_{f4}$ derived from a temperature detection circuit 16. The changeover circuit 17 is an adaptive controller which will override the current value $I_{f1}$ (determined on the basis of VBC) and select another command value having a higher priority. In this respect, the value selected is not an absolute current value. The value of $I_{f4}$, however, is arranged to take precedence over the values $I_{f1}$-$I_{f3}$ if the value of $I_{f4}$ is lower than the values of $I_{f1}$-$I_{f3}$.

A deviation amplifier circuit 10 compares the target current command value $I_{f0}$ with an actual current value signal $I_{ff}$ from a field current detection circuit 9, amplifies the deviation, and outputs a current deviation signal $\epsilon_1$ as a final current command value.

A field current supply circuit 7 comprising, for example, a Pulse Width Modulation (PWM) control circuit and a Field Effect Transistor (FET) drive by the output thereof, controls the field winding current $I_{CH}$ with a chopper action having a duty period responsive to the current deviation signal $\epsilon_1$.

The current detection circuit 9 detects the current flowing through a current detection resistor 8 connected in series with the field winding circuit 2, and outputs the constant current signal $I_{ff}$ in response to the detection current.

There are two kinds of current sources for the field current, one a direct current rectified through the rectifier 3, and the other a direct current from the battery 6; in a normal operation, the field winding is self-excited by the output current from the rectifier 3. However, when starting the engine, for example, since the number of revolutions $N_G$ of the generator is low and an insufficient generation current is obtained, at this instant current is supplied from the battery.

Figure 3:
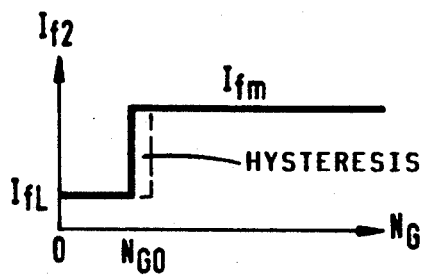
FIGS. 3 to FIG. 5 are operating diagrams showing one example of the control operation in the present invention.

The initial excitation circuit 14 has the function of setting the present current command value $I_{fm}$ at $I_{fL}$ so as to reduce the field current $I_{f2}$ to a minimum necessary value as shown in FIG. 3 when the number of the engine revolutions is below a predetermined value $N_{GO}$ and the driving torque required to turn the generator heavily loads the engine. The effect of hysteresis is shown in broken lines.

Figure 4:
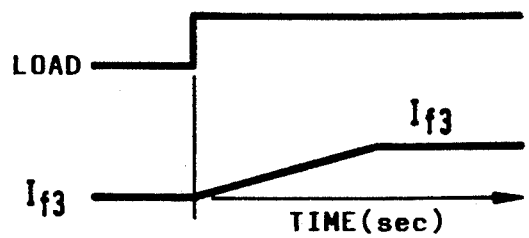

A load response circuit 15 detects the turn-on of a load by the sudden change of the battery voltage, and when the number of engine revolutions is low such as during idling, the circuit 15 outputs a ramp shaped current command value $I_{f3}$ in which the current command value is gradually increased up to the target current command value in 2~3 seconds, as shown in FIG. 4.

Figure 2A:
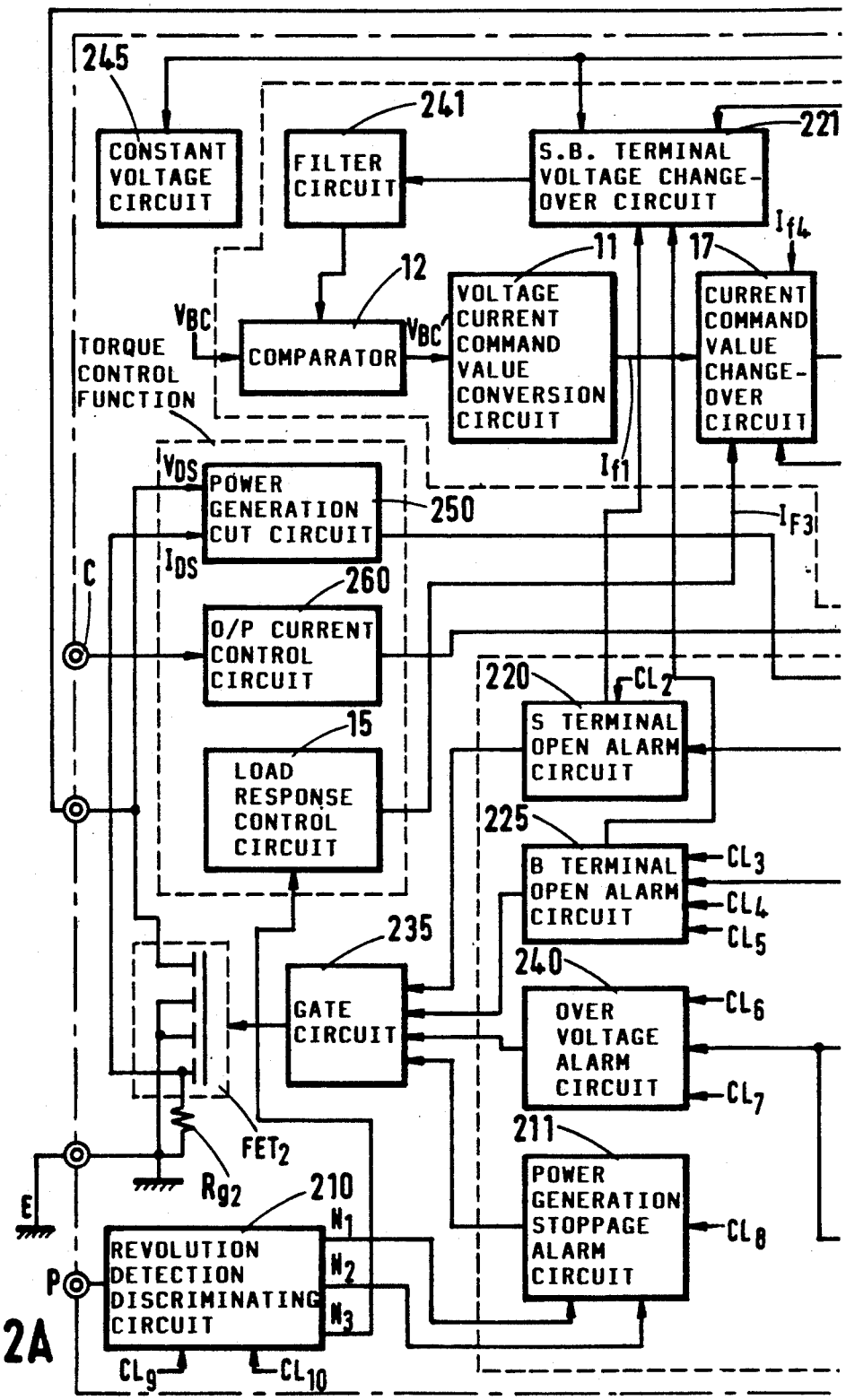
FIGS. 2A and 2B are a control block diagram of an entire system of the control device in a charging generator for use with an automobile in accordance with this invention.
Figure 2B:
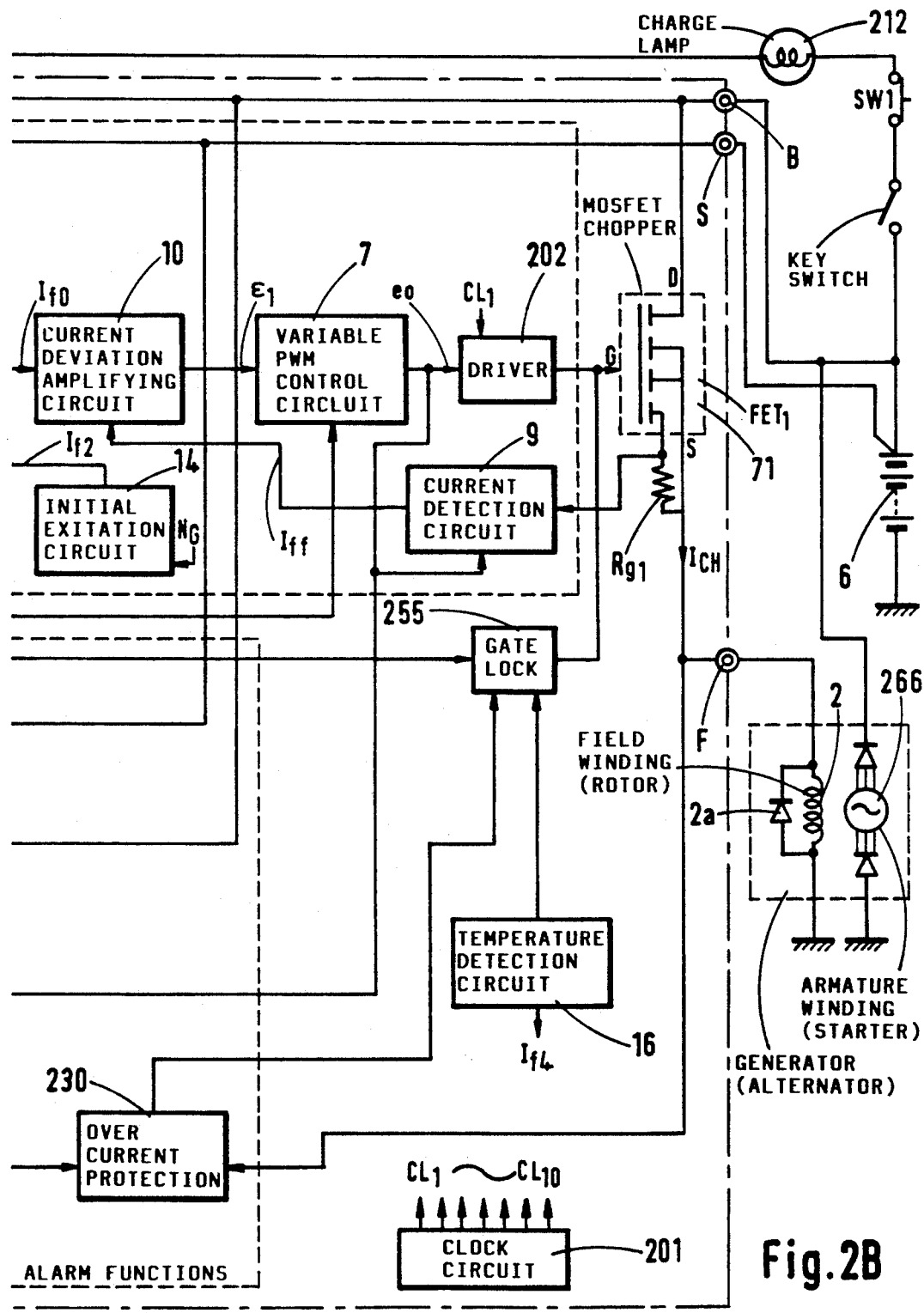
Figure 5:
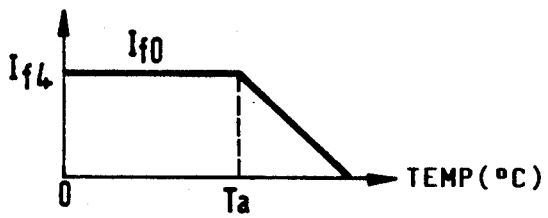

A temperature detection circuit 16 detects the temperature of the semiconductor switching element used for a MOSFET chopper 71 shown in FIG. 2, and when the temperature on the surface of the integrated circuit mounting the MOSFET exceeds a predetermined value Ta, (e.g. 150° C.), outputs a command value $I_{f4}$ for decreasing the current command value $I_{fm}$ in response to the increase in temperature, as shown in FIG. 5. Also, if $I_{f4}$ drops below $I_{f0}$ then the changeover circuit 17 switches to control $I_{f4}$. If $I_{f4}$ falls to zero amps (say about 175° C.) then the generator is switched off for self-protection.

The fundamental concept of the present invention will now be explained.

A field winding current command value generation means, A, generates a field current command value $\epsilon_1$ based upon a current command signal $I_{f0}$ in response to the voltage deviation $\epsilon_2$ between the battery voltage $V_{Bd}$ and the L. predetermined set voltage $V_{Bc}$ and a signal $I_{ff}$ from a field current signal generation means B. and based upon this field current command value $\epsilon_1$ a predetermined current is supplied to the field winding from a field winding current supply means C.

When the battery voltage reduces due to the turn-on of one or more of the loads connected to the battery, the current command value $\epsilon_1$ correspondingly increases to increase the field winding current $I_{CH}$. As a result, the output voltage of the generator is increased to charge the battery up to a predetermined voltage.

By virtue of such control, if the temperature of the field winding rises causing the resistance value thereof to increase under the influence of the temperature, the field current is reduced.

When the field current $I_f$ tends to decrease, however, the current command value $I_{f0}$ increases due to $V_{Bd}$ decreasing which causes $\epsilon_2$ to increase and thence $I_{f0}$ to increase and automatically increase the supply current $I_{CH}$ so that the generator output does not change even if the resistance value of the field winding increases and the output in response to the requirement of the load (including the battery) is maintained.

Figure 6:
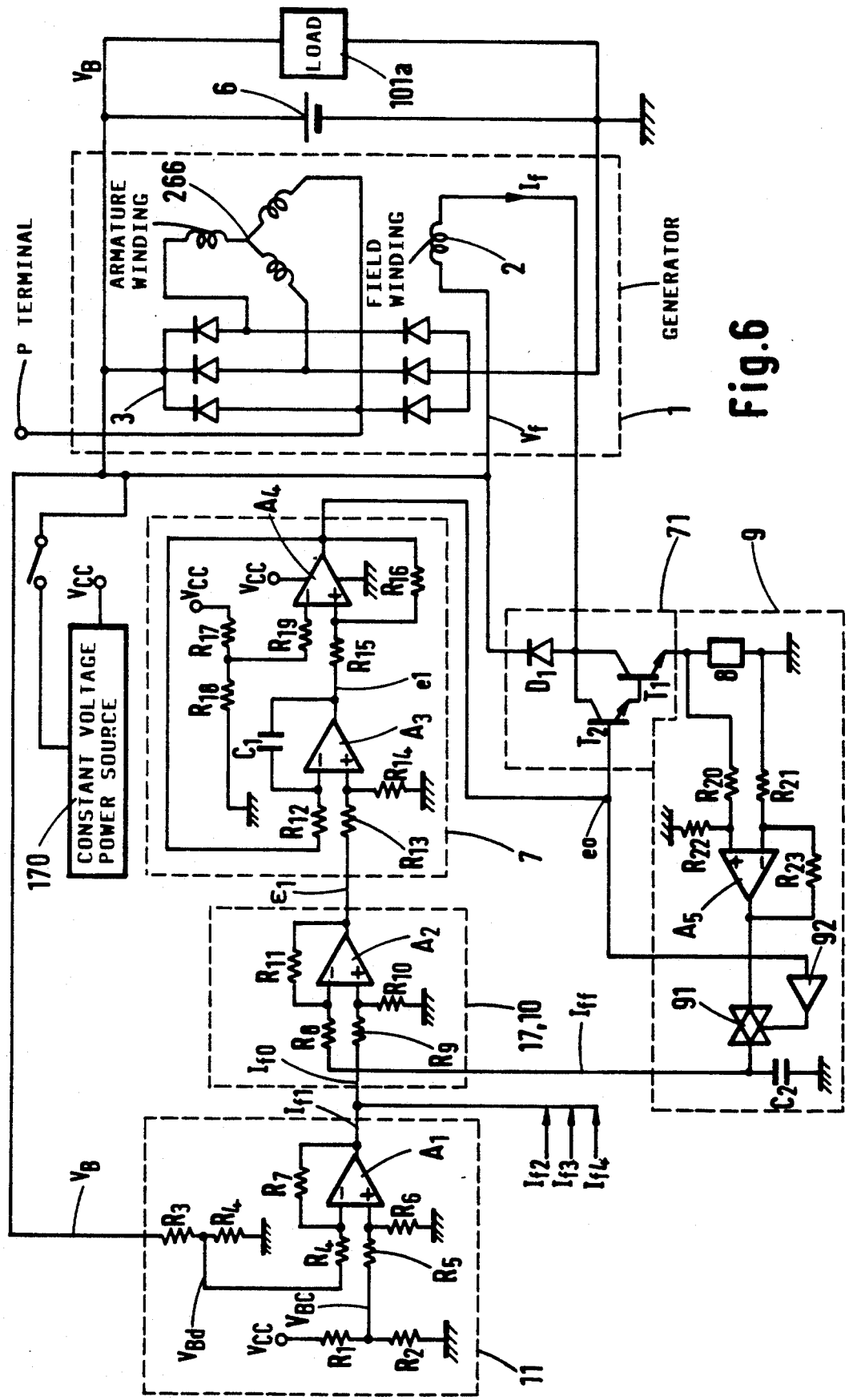
FIG. 6 is a detailed circuit diagram of the embodiment illustrated in FIG. 1.

Referring to FIG. 6, the chopper 71 has switching elements such as power transistors T1, T2 and FETs (not shown) which switch-control current flowing through the field winding 2, and the constant voltage power source unit 170 supplies the power source voltage $V_{cc}$ to the various control circuits, the other parts being as shown in FIG. 1. In the voltage-current command value conversion circuit 11, $R_1$ and $R_2$ are divider resistors which divide the output power source voltage $V_{cc}$ of the constant voltage power source circuit 170 and output a set value $V_{BC}$ of the charging voltage for the battery 6. $R_3$ and $R_4$ are input divider resistors which feed-back battery voltage $V_B$. An operation amplifier $A_1$, includes input resistors $R_4$ to $R_6$ and a feedback resistor R, and constitutes the comparator 12 and command value conversion circuit 11. In the changeover circuit 17 and deviation amplifier 10 is an operation amplifier $A_2$ which includes input resistors $R_8$, $R_9$ and $R_{10}$ and a feedback resistor $R_{11}$, the deviation amplifier 10 calculating the deviation between the command value $I_{f0}$ which is selected among the current command $I_{f1}$ from the voltage-current command value conversion circuit 11 and command values $I_{f2}$, $I_{f3}$, and $I_{f4}$ and the output $I_{ff}$ of the field current detection circuit 9. In the field winding current supply circuit 7 an operational amplifier $A_3$ constitutes an integrator having input resistors $R_{12}$, $R_{13}$, and $R_{14}$, and a feedback capacitor $C_1$ so as to integrate the input voltage and an adding and subtraction operation is performed between the input signal $\epsilon_1$ applied through the input resistor $R_{13}$ and the voltage applied through the other input resistor $R_{12}$. The output $\epsilon_1$ of the integrator is applied to the positive terminal of an operational amplifier $A_4$ through an input resistor 15 and the output $\epsilon_0$ of amplifier $A_4$ is fed back to the positive terminal thereof through a feedback resistor $R_{16}$ to constitute a comparator having hysteresis. The operating level of this comparator $A_4$ is provided by an input resistor $R_{19}$ after dividing the power source voltage $V_{cc}$ with divider resistors $R_{17}$ and $R_{18}$. By virtue of the combination of the integrator and the comparator when the output eo of the comparator is fed back to the input of the integrator, the integrator operates as a self-exciting oscillator outputting a rectangular wave. Thus, a PWM control circuit is formed in which the duty cycle changes in proportion to the input voltage $\epsilon_1$.

The chopper circuit 71 is composed of a power transistor $T_1$ and driver transistor $T_2$ as switching elements, a flywheel diode $D_1$, and the shunt resistor 8 is used for current detection of the power transistor $T_1$. The circuit 71 switchingly controls the current $I_f$ flowing through the field winding 2 with the output signal eo from the PWM control circuit of the field winding current supply circuit 7. Instead of using power transistor $T_1$ and driver transistor $T_2$ as switching elements, FET's may be employed.

In the field current detection circuit 9, $A_5$ is an operational amplifier which includes input resistors $R_{20} \sim R_{22}$ and a feedback resistor $R_{23}$. An analogue switch 91 is driven by the output of the circuit 7 through a buffer amplifier 92, and $C_2$ is a capacitor used for holding the output voltage.

Figure 7:
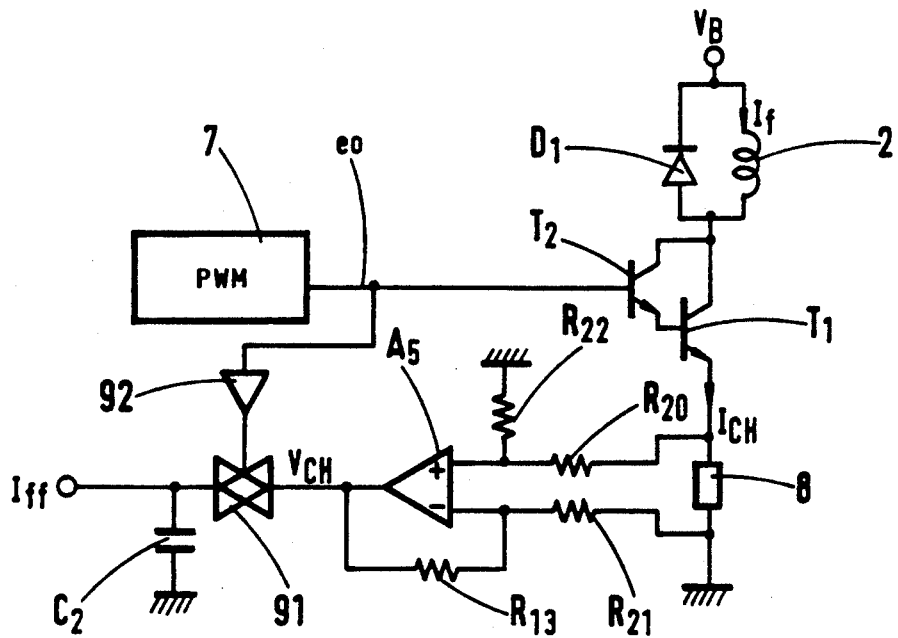
FIG. 7 is a detailed diagram of the current detection circuit used in the present invention.
Figure 8:
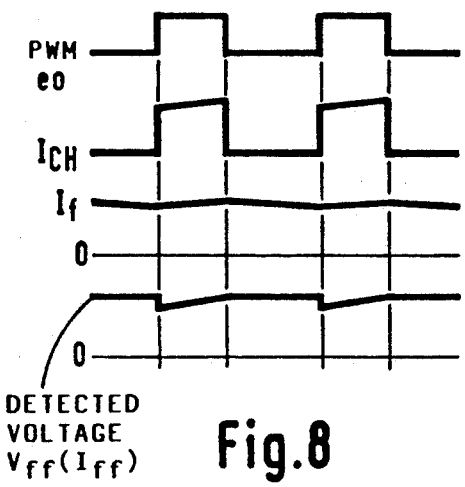
FIGS. 8 to FIG. 11 are diagrams for explaining the operation and characteristics of the present invention.

The operation of the respective portions of the above circuit will now be explained referring to FIG. 7 which shows the current detection circuit, and FIG. 8 shows operating waveforms at respective portions thereof. Current detection with the current detection circuit is carried out by detecting the current $I_{CH}$ of the power element which is an intermittent (chopped) current as shown in FIG. 8.

The chopper current $I_{CH}$ is detected through the shunt resistor 8 and amplified by the operational amplifier $A_5$ to form a signal $V_{CH}$. The chopper detected signal $V_{CH}$ is sample-held by the Circuit consisting of the analogue switch 91 and the holding capacitor $C_2$ and converted into a simulated field current signal $V_{ff}$.

In more detail, the analogue switch 91 is turned OFF in synchronism with the PWM signal eo of the output from the PWM control circuit 7, and the chopper current $I_{CH}$ immediately before the chopper is turned OFF is held by capacitor $C_2$, and the detected signal at this moment is used as the signal $V_{ff}$. Such holding of the chopper current is required since otherwise the circuit would be unstable due to $I_{CH}$ being a pulsed current from the MOSFET source terminal. Further, during the chopper ON period the analogue switch 91 is turned ON and the detected signal $V_{CH}$ of the chopper current $I_{CH}$ is used as the signal $V_{ff}$. The ON and OFF operation of the analogue switch 91 is carried out with the above PWM control signal eo through the buffer 92.

Figure 9:
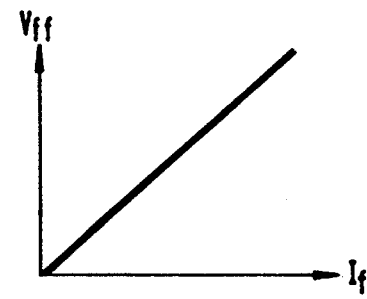

By virtue of the above operation, the waveform of the simulated field current detection voltage $V_{ff}$ which is obtained from the chopper current is an operating waveform which substantially approximates to the field current $I_f$ and is uninterrupted, as shown in FIG. 8. As a result, the field current detection circuit exhibits a static characteristic having a good linear characteristic as shown in FIG. 9 of $V_{ff}$ against $I_f$, and can detect the field current over a broad range from a small field current to a large field current. Further, since the circuit necessitates no isolation detector, an inexpensive current detector is formed.

Next, the current control operation will be explained. Reverting to FIG. 6, the PWM control circuit 7 is for PWM controlling the chopper 71 and includes the amplifier $A_3$, the integrator comprising capacitor $C_1$ and resistor $R_{12}$ and the comparator having hysteresis in which the output of amplifier $A_4$ is positively fed back through the resistor $R_{16}$. Further, by feeding back the output eo of the comparator $A_4$ to the integration resistor $R_{12}$, a PWM control circuit capable of the duty control is obtained. The above PWM control circuit has the function in which the conduction rate or duty of the output signal eo with regard to an input signal (voltage) $\epsilon_1$ is proportionally controlled.

The input signal $\epsilon_1$ for the PWM is provided from the deviation amplifier 10. In this respect, in the deviation amplifier 10, the difference between the signal $I_{fo}$ from the chargeover circuit 17 and the above mentioned field current detection signal $I_{ff}$ is multiplied by the gain of the amplifier 10 ($G = R_{11}/R_8 = R_{10}/R_9$) to output as the input signal $\epsilon_1$ for the PWM control circuit.

Accordingly, the current control is carried out through the circuit constituted by the deviation amplifier 10, the PWM control circuit 7, the field current detection circuit 9, the chopper circuit 71 and the field winding 2.

Now, when the field current command $I_{fo}$ is produced, the deviation amplifier 10 generates the deviation signal $\epsilon_1$ as input to the PWM circuit 7 in dependence upon the current feedback signal $I_{ff}$. The PWM control circuit 7 Operates the chopper 71 with the PWM output signal eo and by feedback, controls the field current $I_f$ so that it coincides with the command value $I_{fo}$.

Figure 10:
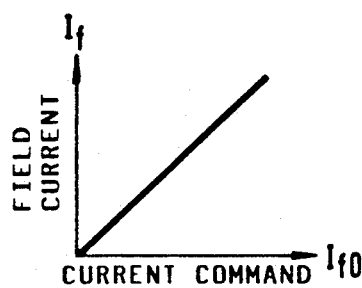

Thus, the field current $I_f$ is readily set by changing the current command value $I_{fo}$ as shown in FIG. 10.

The PWM Circuit shown in FIG. 6 is constituted as a variable frequency type PWM circuit. In such a PWM control circuit, the pulse frequency is arranged to maximize at 50% of $\epsilon_1$, the frequency changes in dependence upon $\epsilon_1$ which thus represents the conduction rate and $\epsilon_1$ frequency is controlled to decrease above this point.

Figure 11:
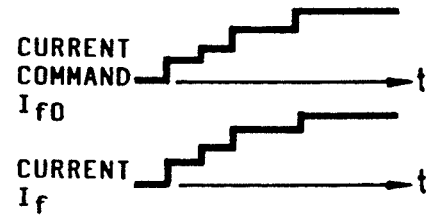
Figure 12:
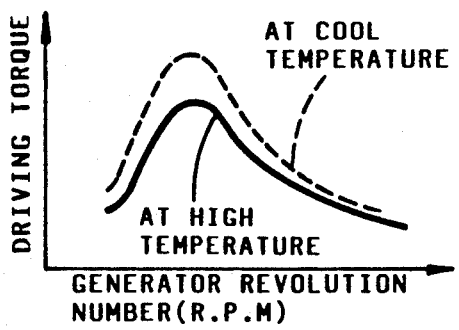
FIG. 12 and FIG. 13 are graphs for explaining the advantages of the present invention, FIGS. 14(a) and (b) are graphical diagrams for explaining the operating principle of the load response control circuit of the present invention.
Figure 13:
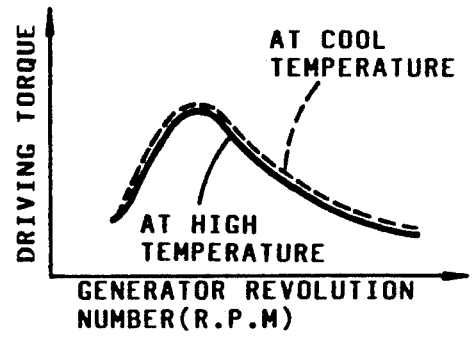

Further, even if the current command $I_{fo}$ is abruptly changed, the field current $I_f$ varies in a stepwise fashion to follow the command value as shown in FIG. 11. The benefit of such control will be described with regard to FIGS. 12 and 13. As shown in FIG. 12, which shows generator drive torque against generator speed, in a conventional conduction rate control the torque required to drive the generator has a characteristic such that the torque changes in dependence upon temperature change, in that the torque required to drive the generator becomes large at a cool temperature and small at a high temperature for a given generator r.p.m. As a result, the capacity of the field winding of the generator and elements for the chopper in the prior art have to be designed to withstand the increased power generated for the torque required at cool temperatures so that there arose the problem of requiring an excess, i.e. heavy duty, specification. However, with the current control of the present invention, even if there is a resistance difference between cool temperatures and the high temperatures in the field winding, as shown in FIG. 13 the current can be controlled to the target current so that influence caused by temperature differences are substantially eliminated. Further, influence from current variation due to the variation of, for example, the power source voltage, does not affect the generator. Accordingly, the previous design requirement to exceed the specification for the field winding in the generator and the switching elements in the chopper is eliminated, and an increase in the capacity of the generator may be achieved. Namely, when the maximum operating value in a normal operating condition is increased up to the characteristic for cool temperature, the capacity increases corresponding thereto, and a generator having a high output is realized. The increase over conventional generators having the same winding and chopper is about 10%.

The operation of the voltage control circuit using the above explained current control circuit is as follows. Now returning to FIG. 6, the voltage control circuit 11 controls, by feedback, the actual battery voltage (generator output voltage) $V_B$ so as to coincide with the battery charging voltage value $V_{BC}$. The operation amplifier $A_1$, produces current command signal $I_{fo}$ in dependence between the battery set voltage $V_{BC}$ and the battery voltage $V_B$. As explained above the output signal $\epsilon_1$ of the current control circuit 10 is derived. The PWM control circuit 7 generates the pulse width control pulse output eo in response to the output signal $\epsilon_1$ and applies an intermittent pulse voltage $V_f$ to the field winding 2 in the generator through the chopper 71, to thereby control the field current. In the above control operation, the field current $I_f$ is detected by the shunt resistor 8 as explained hereinbefore, and fed back to the current control deviation amplifier circuit 10 through the current detection circuit 9 to carry out the current control. As a result, the armature winding output voltage is controlled to charge the battery 6 and supply current to the load 101a through the three phase rectifier 3. Further, the output voltage $V_B$ of the generator 1 is fed back to the circuit 11, so that the output voltage is feedback-controlled so as to coincide with the battery set voltage $V_{BC}$.

Other features of the present embodiment will now be described with reference to FIG. 2.

1. Clock circuit 201

The clock circuit 201 generates a fundamental clock frequency of 1 MHz and other signals divided therefrom. $CL_1$ is the fundamental clock frequency of 1 MHz, drives a driver circuit 202, which charges the gate of FET1 forming the chopper 71 to a high voltage above the B terminal voltage, FET1 being used in the FIG. 2 embodiment instead of the transistors $T_1$ and $T_2$ of FIG. 6.

$CL_2 \sim CL_{10}$ are clock signals formed by dividing $CL_1$ and are supplied to the respective clock inputs as clock signals.

2. Revolution detection discriminating circuit 210

This circuit detects the number of revolutions (r.p.m.) of the generator and outputs revolution number signals for changing over circuit operations.

Since the frequency $f_p$ at the terminal P (one phase of armature winding) is expressed as follows, $$f_p = \frac{N \times q}{60 \times 2} (Hz)$$

(wherein, N is the revolution number (r.p.m.) of the generator; q is the number of poles in the generator; 2 is a constant for full wave rectification), the detection of the revolution number is achieved by frequency comparison between this frequency $f_p$ and the clock pulses $CL$, and $CL_{10}$.

When the revolution number of the generator is more than 500 r.p.m., the output N1 becomes "1" and below that becomes "0".

When the revolution number of the generator is more than 2500 r.p.m. the output N3 becomes "1" and below that becomes "0".

3. Power generation stoppage alarm circuit 211

The role of this circuit is to light a charge lamp 212 for indicating when the power generation is stopped in order to prevent engine stoppage due to no charging of the battery if the field winding or armature winding is disconnected or if the FET1 goes open circuit.

In operation, the charge lamp is lit when the revolution number of the generator is below 1000 r.p.m. When the revolution number reaches above 1000 r.p.m., the charge lamp extinguishes. When the engine revolution number again decreases below 500 r.p.m., the charge lamp again lights.

Assuming that the idling revolution number of the engine is 700 r.p.m., and the pulley ratio between the crank pulley and the pulley of the generator is 2, the revolution number of the generator during idling is 1400 r.p.m. Thus, when the generator is normal, the charge lamp is not lit.

When the number of revolutions is zero, no power is generated, and the charge lamp lights.

Figure 19:
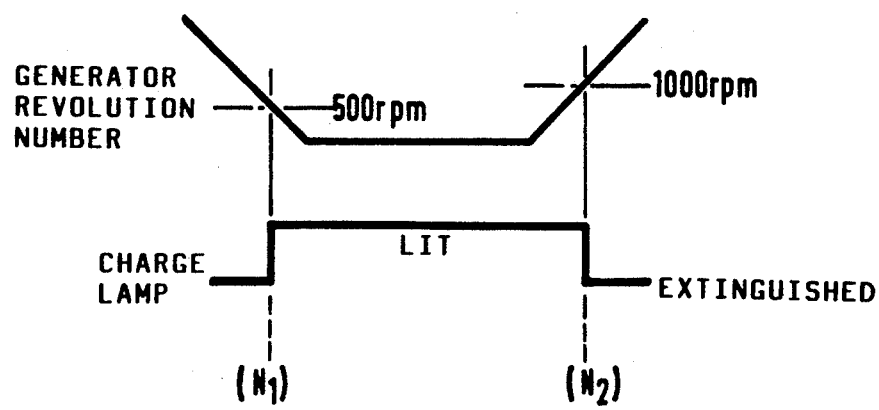
FIG. 19 and FIG. 20 are views showing the relationship between the number of revolutions of the generator and the lighting condition of the charge indicating lamp.
Figure 20:
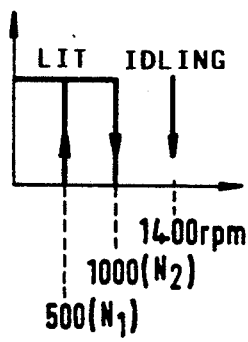

One of the important points is that hysteresis is provided between N1 and N2, which reduces driver anxiety since the lamp does not flicker during starting or idling (refer to FIG. 19 and FIG. 20).

4. S terminal opening alarm circuit 220

The sensing terminal S senses the true battery voltage whereas the voltage at terminal B is subject to volt drop due to wiring resistance.

In the event that the S terminal (battery voltage $V_s$ sensing terminal) is rendered open-circuit due, for example, to wiring disconnection, this circuit is used as follows:

(1) to prevent the generator from going out of control, and (2) to provide a warning to a driver by flickering the charge lamp 212.

The operation of the circuit 220 is as follows:

(1) In normal operation, the voltage control is carried out by comparing the S terminal voltage $V_s$ which is divided to be $V_{Bd}$ with the reference voltage $V_{BC}$. When the S terminal is disconnected from the battery or the battery voltage reduces below a predetermined value (7 V), the terminal is changed over from S to B by a S·B terminal voltage change-over circuit 221.

Figure 21:
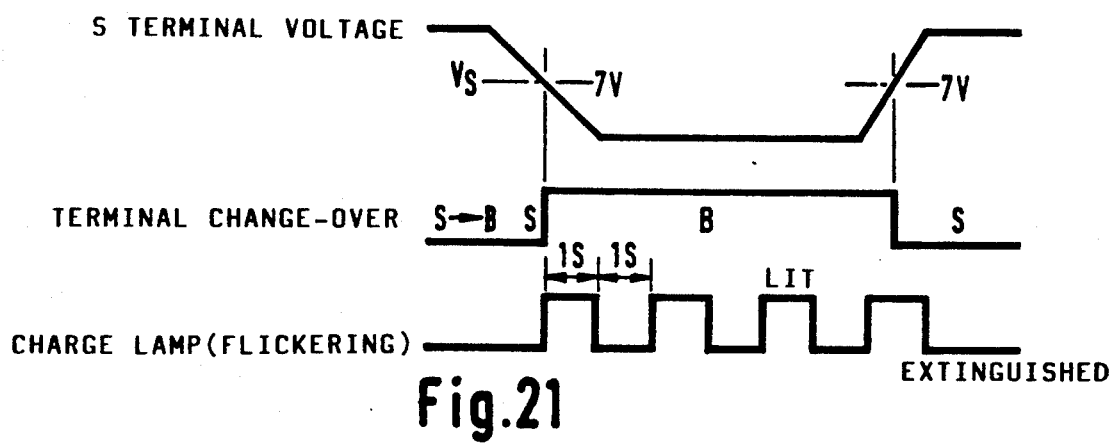
FIG. 21 shows a S-B terminal changed-over condition and a flickering condition of the charge lamp with regard to S terminal voltage.

(2) Simultaneously, the charge lamp 212 is flickered. This flickering is carried out by repeated lighting and extinguishing of the charge lamp with an interval of one second (the operation is graphically shown in FIG. 21).

5. B terminal open alarm circuit 225

In the event that the B terminal (output cable from the generator) is rendered open-circuit due, for example, to wiring disconnection, this circuit is used as follows:

(1) to prevent the generator from going out of control, (2) to provide a warning to a driver by flickering the charge lamp.

If the vehicle continues to be driven when the B terminal is open, the battery discharges (since it is therefore not being charged) and the engine finally stops due to the battery being discharged.

The operation of the circuit 225 is as follows:

(1) When the S terminal is decoupled, there is no charging into the battery, the S terminal voltage reduces (with regard to a normal condition voltage of 14.5 V, the voltage reducing to about 11-12 V). As a result, the field current command value increases to increase the B terminal voltage. Thereby, when $V_B$ becomes more than a predetermined value (18 V), the voltage detection terminal is changed over from the S terminal to the B terminal by the S·B voltage change-over circuit 221. Thereby, $V_B$ is controlled at 14.6 V.

(2) Simultaneously the charge lamp 212 is flickered.

(3) The operation of (1) and (2) is reset every predetermined interval (one minute) so as to return the battery sensing voltage $V_s$ to the normal condition when the B terminal open condition is restored to the normal condition.

Figure 22:
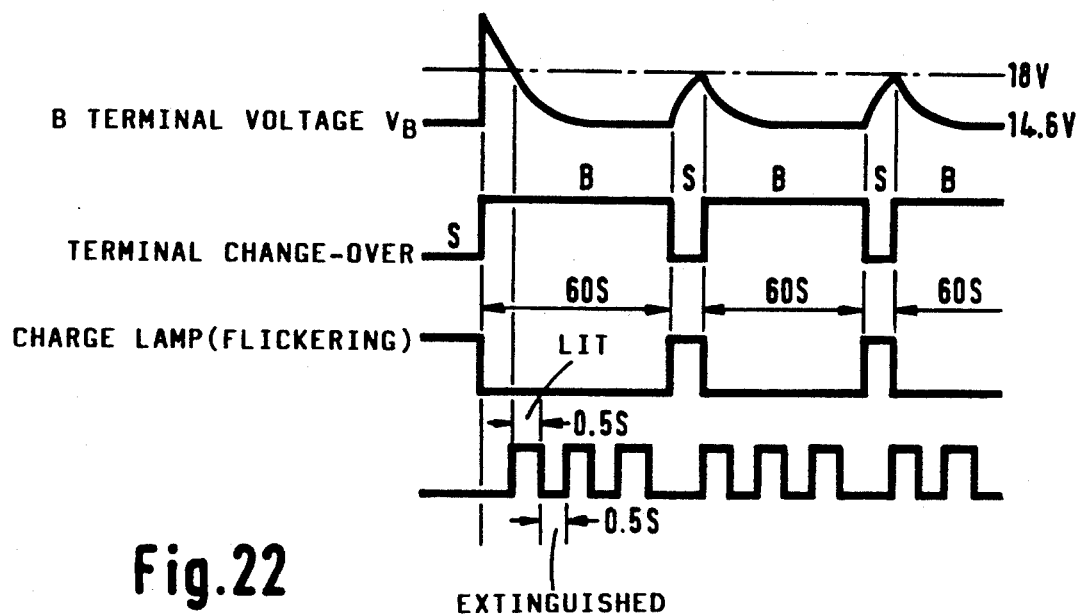
FIG. 22 shows a terminal changed-over condition, a gate lock condition, and a charge lamp flickering condition with regard to B terminal voltage.

The function of this circuit is graphically shown in FIG. 22.

6. Overvoltage alarm circuit 240

The role of this circuit is to issue an alarm if the voltage control goes out of control for some reason.

Herein, conceivable reasons for the voltage control becoming unstable are as follows:

(1) When the FET1 is short-circuited and breaks down.

(2) The B terminal and the F terminal are short-circuited by an external cause, for example a piece of metal connecting the B and F terminals.

If the operation is continued in the out of voltage control condition, (i) the battery is over-charged and the engine compartment is filled with hydrogen gas to cause the danger of explosion, (ii) an overvoltage is induced during high speed generator revolutions causing electric loads on the vehicle, such as lamps and electronic apparatus to be damaged. Such undesirable conditions are forewarned by indicating with the circuit 230.

Figure 23:
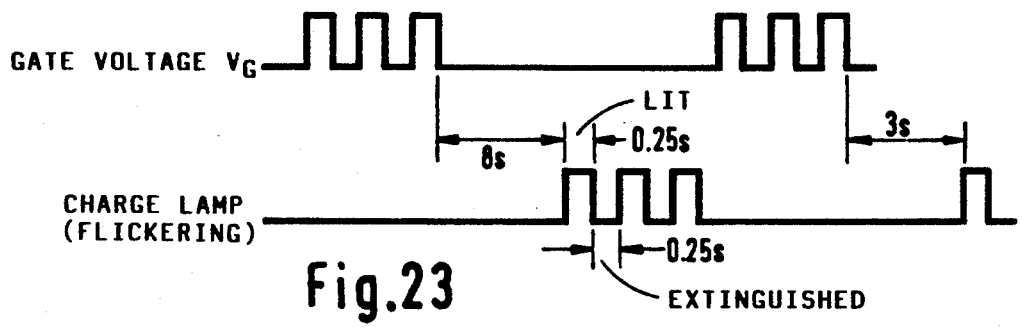
FIG. 23 shows a charge indicating lamp flickering condition with regard to gate voltage, FIGS. 24(1) to 24(8) show lighting and flickering conditions of the charge indicating lamp in different abnormal conditions.
Figure 25A:
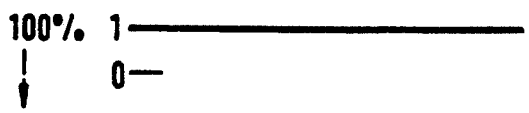
FIGS. 25(a) 25(d) show a signal inputted to a C terminal as an external signal.
Figure 25B:
Figure 25C:
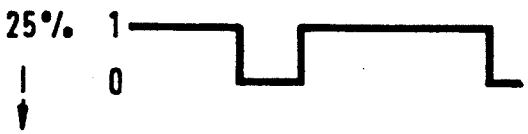
Figure 25D:

In the operation of the above, the field current command value is rendered zero, and the gate voltage of the FET1 is continuously kept 0 V. However, when the gate voltage 0 V continues more than a predetermined interval (3 seconds), the circuit judges that an overvoltage mode is induced, and flickers the charge lamp 212. The lamp flickering cycle is 0.25 second alight and 0.25 second extinguished, as shown in FIG. 23.

7. Gate circuit 235

The role of this circuit is to flicker the charge lamp 212 and to thereby issue an alarm, when the S terminal and the B terminal are open-circuited, an overvoltage is I? induced and the power generation is stopped. The operation is carried out by calculating the logical sum (OR) of the four signals from the previously described circuits 220, 225 and the overvoltage alarm circuit 240 and power generation stopped circuit 211, and by driving the gate of the FET2.

An important point is that since the flickering cycles are differentiated depending upon the causes by changing the cycle with an integral number multiplication, the wrong portion can be determined by noting the flickering pattern of the charge lamp. Further, a priority can be assigned to the lamp indications depending upon their importance, for example depending upon the following order the flickering frequency may be reduced, (1) power generation stoppage, (2) overvoltage, (3) B terminal open, and (4) S terminal open, as shown with reference to FIG. 24. FIG. 24 also shows various combinations of the above in graphical subfigures (5) to (8).

8. Overcurrent protection 230

The role of this circuit is to prevent breakdown of the FET1 due to overcurrent conduction, when the field winding is short-circuited.

Its operation is to lock the gate of the FET1, when he voltage at F terminal is maintained low even though eo is high.

9. Initial excitation circuit 14

The role of this circuit is to detect a condition in which the revolution number $N_G$ of the generator is as low as the revolution number $N_1$ (=500 r.p.m.) to disable the self-excitation power generation, and to output a current command value $I_{f2}$ so as to render the conduction rate of the chopper to be about 30%, and based thereon, a target current command value $I_{fo}$ is outputted from the change-over circuit 17.

10. S.B. terminal voltage change-over circuit 221

The role of this circuit is to always feedback the S terminal voltage (the voltage directly applied by the battery) through a filter circuit 240, to input the B terminal voltage to continue the voltage control in the event that the voltage control is being performed when the S terminal is decoupled to thereby prevent a non-charging condition to the battery from the generator.

In operation, the B terminal voltage and the S terminal voltage are applied to circuit 221. Then, when a signal from the S terminal open alarm circuit 220 is generated, the detection terminal is changed over from the S terminal to the B terminal. When a signal from the B terminal open alarm circuit 225 is generated, the voltage signal is changed over from the S terminal to the B terminal to output the B terminal voltage to the filter circuit 240.

11. Filter circuit 241

The role of this circuit is to smooth any ripple in the rectified output voltage of the generator at the S·B terminal voltage and to stabilize the voltage feedback control.

In operation, the ripple voltage is eliminated by using a Miller integrator type low pass filter, the battery average voltage is outputted, and the battery voltage is fed back to the voltage-current command value conversion circuit 11. Thereby, the average value of the battery voltage is precisely detected to render the current command value $I_{f1}$ a control signal which is ripple free.

12. Constant voltage circuit 245

The role of this circuit is to convert the battery voltage to a predetermined constant voltage and thereafter to supply current to respective control circuits.

13. Voltage-current command value conversion circuit 11

The role of this circuit is to generate the current command value $I_{f1}$ which controls the field current of the generator so as to maintain the battery terminal voltage at a constant value in response to a battery voltage set value.

In operation, the deviation between the battery set voltage $V_{BC}$ and the output $V_{BD}$ from the filter circuit 241 is obtained by the comparator 12 to provide voltage $V_{BC}$, to circuit 11 where it is amplified to generate the current command value $I_{f1}$.

14. Power generation cut control circuit 250

The role of this circuit is to reduce the driving torque demanded by the generator during the time of vehicle load increase such as acceleration of the vehicle, to thereby enhance acceleration.

Specifically, when a throttle opening degree detection switch SW1, which is connected in series with the charge lamp 212, is opened, for example when the throttle is fully open, power generation is cut until the acceleration is completed (after, for example, about 10 seconds).

In operation, for the detection of power generation cut, the drain-source voltage of the FET2 used for lighting the lamp 212 ($V_{DS}$) is applied to the voltage detection terminal of circuit 250 and serves both for lighting the lamp 212 and detecting the power generation cut.

Thus, in the power generation cut control circuit 250 the drain-source voltage $V_{DS}$ of the FET2 and the current flowing through the detection resistor $R_{g2}$ of the FET2 are inputted. Now, when the switch SW1 opens, the voltage $V_{DS}$ of the FET2 reduces, and when no current is flowing through the FET2, the power generation is cut for the acceleration time of the vehicle, therefore a set value change-over signal is transmitted to the change-over circuit and a chopper gate lock signal is generated to a gate lock circuit 255.

15. Output current control circuit 260

The role of this circuit is to control the maximum power generation of the generator with a signal from an external controller and to suppress the torque generation for achieving enhancement of acceleration of the vehicle, to improve fuel consumption and to prevent engine stoppage.

In operation, a duty signal is inputted from an external controller (not shown) to the output current control circuit 260 through a C terminal and with an output from the control circuit 260 the duty cycle of the PWM control circuit is controlled.

Figure 26:
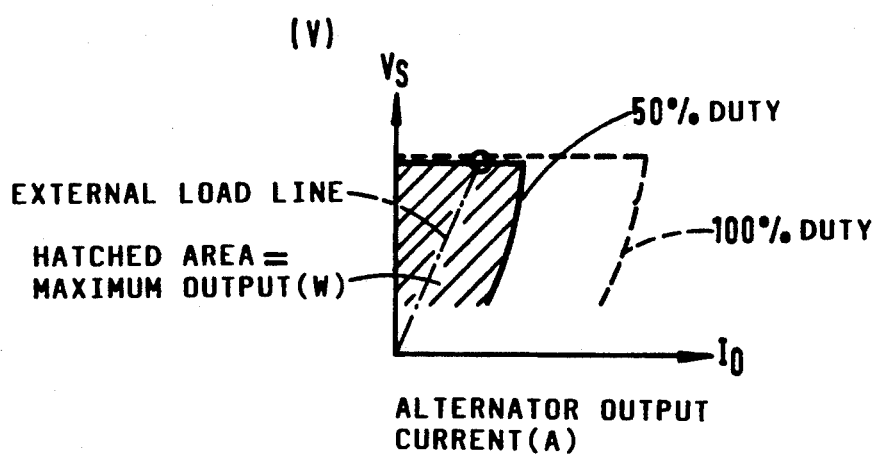
FIG. 26 shows controlled condition of the generator capability.

When the duty of the signal inputted at the C terminal is linearly changed in response to the load on the vehicle as shown in the representative duty cycles of 100% to 0% shown in FIG. 25(a)-(d), the output current-voltage characteristic of the generator is continuously controlled as shown in FIG. 26.

In FIG. 26, as representative examples, examples of duty 100% and 50% are illustrated. In FIG. 26 an external load line is shown in chain broken line and the 50% duty cycle is shown to service the load as indicated by the hatched area.

16. Load response control circuit 15

Figure 14A:
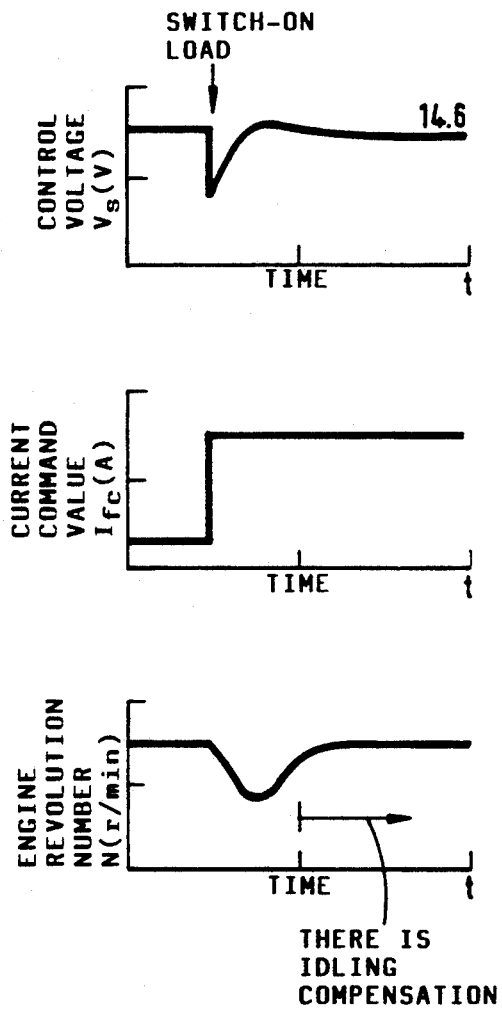

In the present embodiment, a load response control function is provided for reducing variation in the engine r.p.m. due to a sudden electric load change or vibration caused thereby. FIGS. 14(a) and (b) illustrate its operating principle.

When there is no load response control and a load is switched on, the control voltage (the battery terminal voltage) reduces. However, the battery is quickly charged by responding to the current command value $I_{fc}$ in step by virtue of the feedback operation of the control system. At the moment the load is switched on, the generator is a load to the engine. For this reason the number of engine revolutions reduces (as shown in the lowermost graph of FIG. 14(a)). This is problematic in particular near the engine idling condition when the engine revolutions are low, since the increased load on the engine risks the danger of engine stoppage (stalling).

Figure 14B:
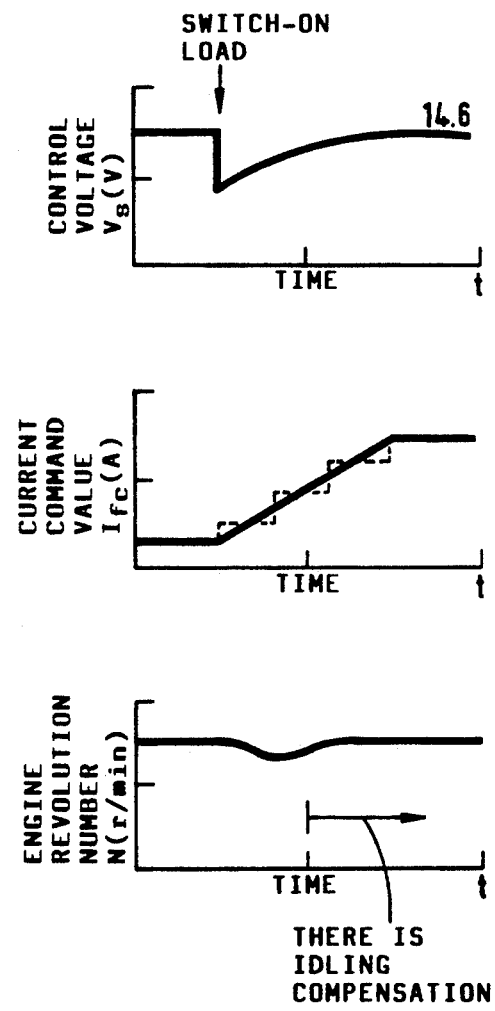
Figure 15:
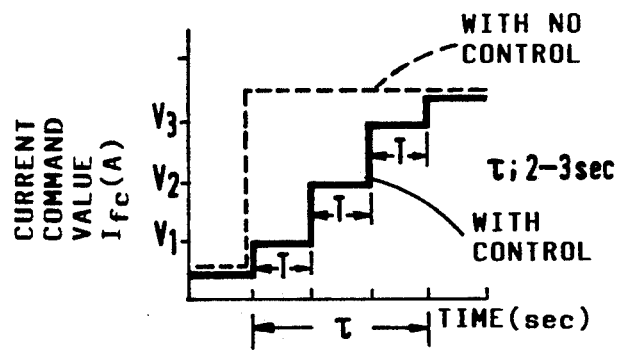
FIG. 15 is a graph for explaining the control operation of the invention.

To overcome such a problem, the load response control 15 controls the generator. Even if the control voltage is reduced by switching on a load, the current command value $I_{fc}$ is controlled to gradually increase with a predetermined pattern (e.g. in a stepwise fashion), the variation in the engine r.p.m. can be reduced, although restoration of the control voltage is delayed (FIG. 14(b)). For accomplishing this purpose, a delay circuit having a predetermined time constant is provided in the control loop so as to change the current command value output for the voltage control in response to the number of revolutions. Patterns of the current command value are illustrated in FIG. 15 in which variation of the command value pattern in dependence upon inclusion and non-inclusion of the load response control is illustrated. In the above mentioned prior art, the current command value is changed in one step and, conventionally with no control, so the value thereof is changed to another reference value after a predetermined reference value is exceeded, but, as preferably provided in this invention, if there is control, the value is fixed for a predetermined time. Thereafter, judgment is carried out whether another reference value is exceeded, and reference values are successively changed over to a next reference value, thereby the current command value slowly rises and in a step-wise manner. Finally, the current command value is fixed to a final reference value which is the same value as that in the prior art with no control. When the current command value reduces, no switching operation of the reference value is carried out, but the value is changed to the same value as that with no control.

Thereby, regardless of the current command value before the load is switched on, the command value is fixed only after a reference value is exceeded, so that over charging and over discharging can be prevented. The load response control is adapted to be carried out near the revolution number at idling of the vehicle engine and to operate below a generator revolution number of 2500 r/min.

Figure 16:
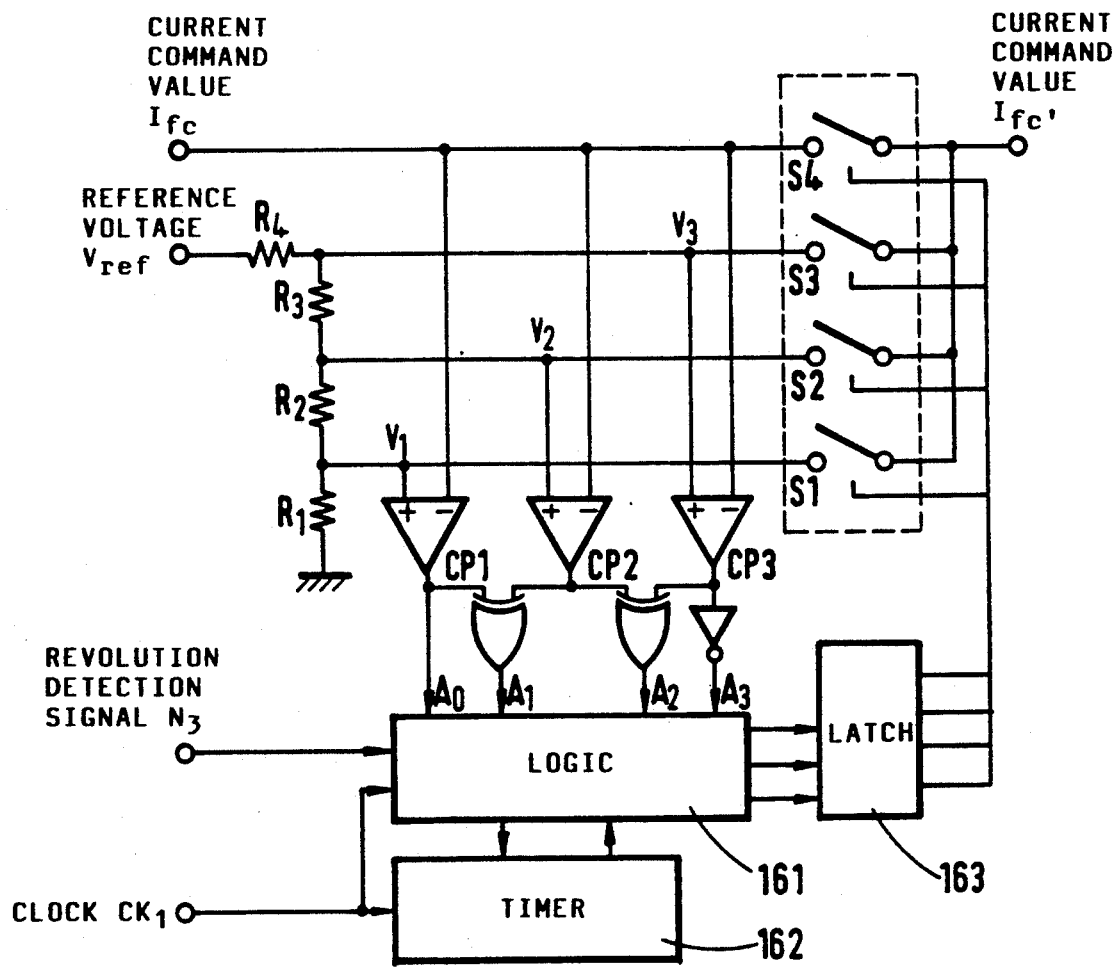
FIG. 16 is a specific circuit diagram of the load response control circuit.

A block circuit for generating an actual command pattern is illustrated in FIG. 16, in which analogue switches S1-S4 switch the current command value $I_{fc'}$, comparators CP1-CP3 compare the divided down reference voltage $V_{ref}$ with the command values, and a digital logic circuit 161 including a timer 162 and a latch 163 control the control operation. The comparison step with the reference value is adapted to be three steps by the voltage divider formed by resistors RS1-RS4 so as not to enlarge the circuit scale since it is built in to an IC.

Figure 17:
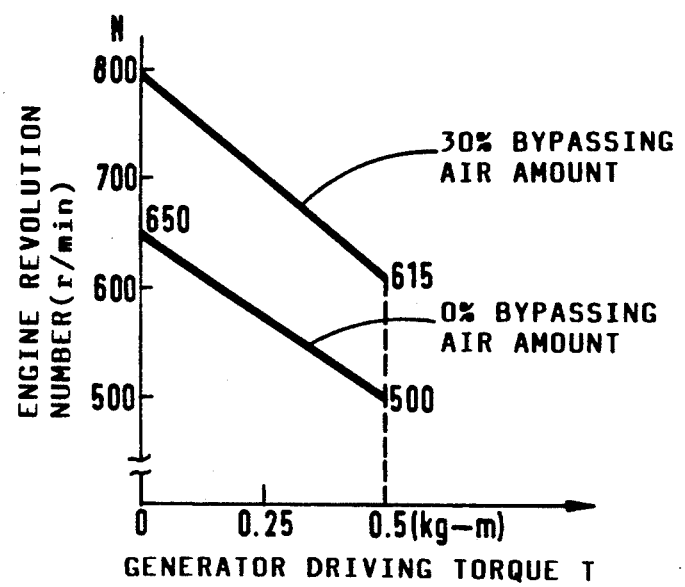
FIG. 17 is a diagram showing the relationship between alternator drive torque and number of engine revolutions when using bypassing air quantity as a parameter.
Figure 18:
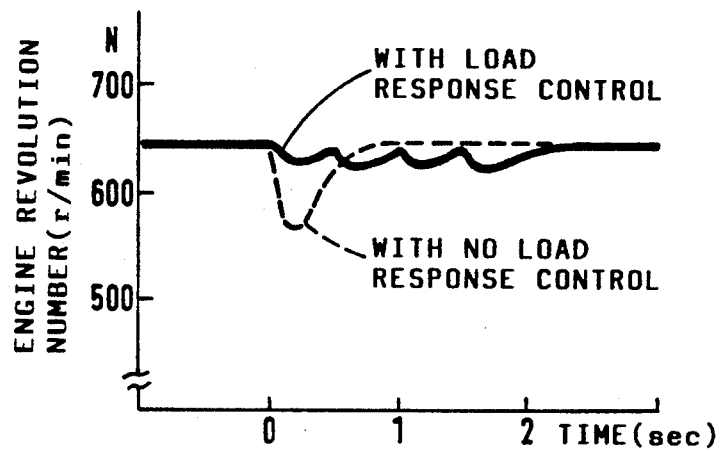
FIG. 18 is a diagram for explaining the effect of the load response control circuit.

For verifying the effects of the above described load response control, simulation thereof was performed. FIG. 17 shows graphs of a model of an external torque-engine revolution number characteristic by using the amount of air drawn by the engine during idling through a throttle bypass passage as a parameter. FIG. 18 shows responses of the idling revolution number when an electric load (equivalent to 20A) is switched on while using this model. With the load response control (shown in solid line), it was confirmed that the reduction of the engine revolution number is reduced to below 25 r/min whereas without the control (shown in broken lines) the revolutions dropped by 100 r/min. when the load was switched on.

Although, in the present embodiment the comparison step is selected to be three, however the present invention is not limited thereto, and can be modified for example to be any number, or even stepless.

Hereinbelow the manner of control carried out by a microcomputer mounted on a vehicle is explained. The principle thereof is explained with reference to the functional block diagram shown in FIG. 27.

The deviation between the set value $V_{BC}$ of the battery voltage and the actual value $V_{BD}$ determined by comparator 12 is amplified by the voltage deviation amplifier 270 and is outputted to a limiter 271.

The limiter outputs a current command value $I_{fo}$ in response to the output from the voltage deviation amplifier 27 Before deciding the current command value $I_{fo}$, the load current supplied to the electric load 101a, and load information to the engine 104 of the vehicle, or environmental information are inputted to a microcomputer 272 which calculates the maximum value of the optimum current command value $I_{fo}$, which maximum value is denoted as $I_{fmax}$ at every moment, and decides and outputs the current command value $I_{fo}$ within the range up to the maximum $I_{fmax}$ in response to the voltage deviation.

Next, the deviation between the current command value $I_{fo}$ and the actual current value $I_f$ is detected by comparator 10, and is applied as an amplified output to the pulse width modulation circuit (PWM) 7.

The PWM 7 drives the chopper 71 in the field winding driving circuit with a duty cycle in accordance with the driving signal to control the field winding current $I_f$. Thereby, the battery is properly charged by the output generated in the armature winding 266 of the generator.

Figure 28:
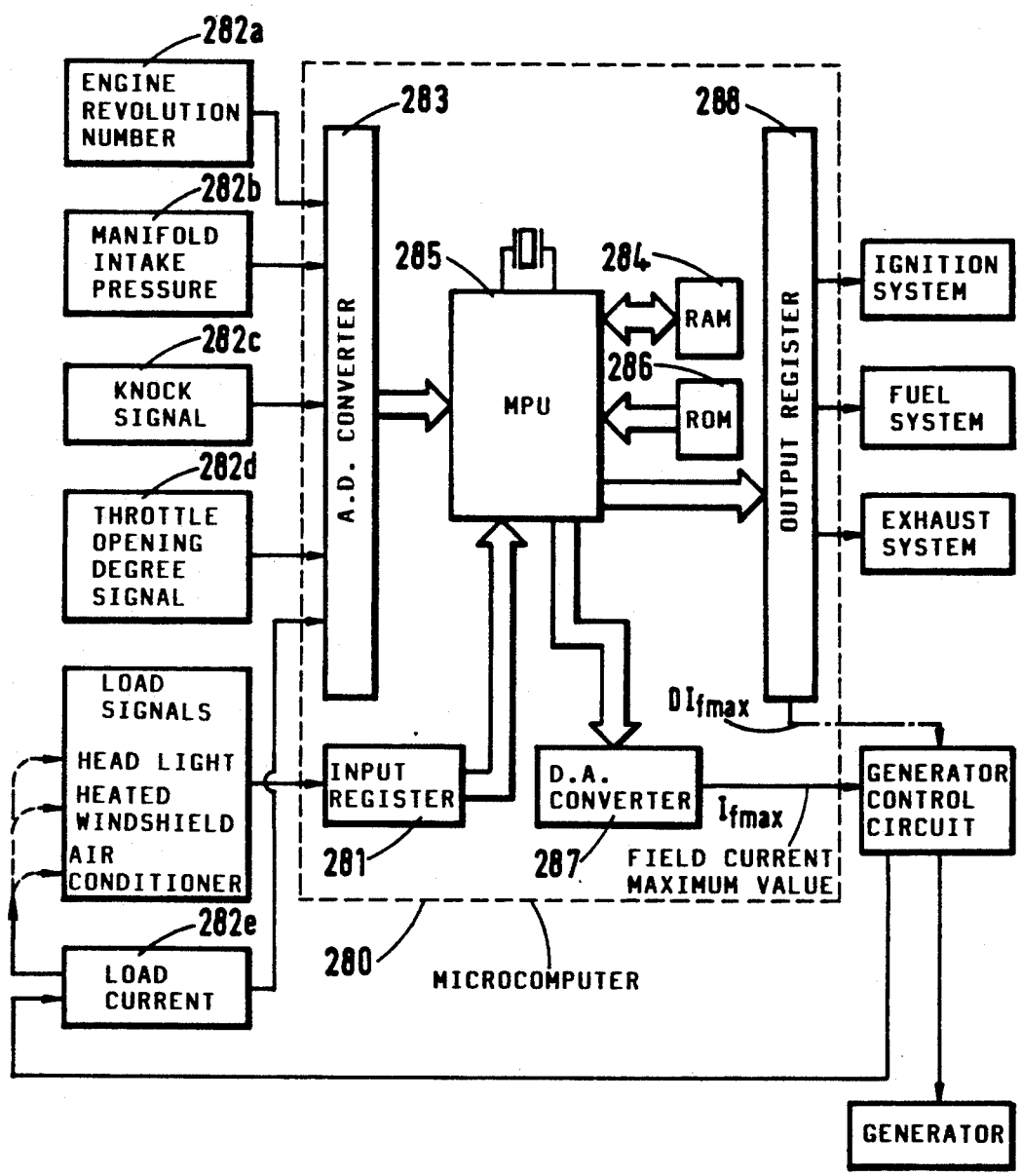
FIG. 28 is a block diagram of the control circuit of the same device shown in FIG. 27.
Figure 29:
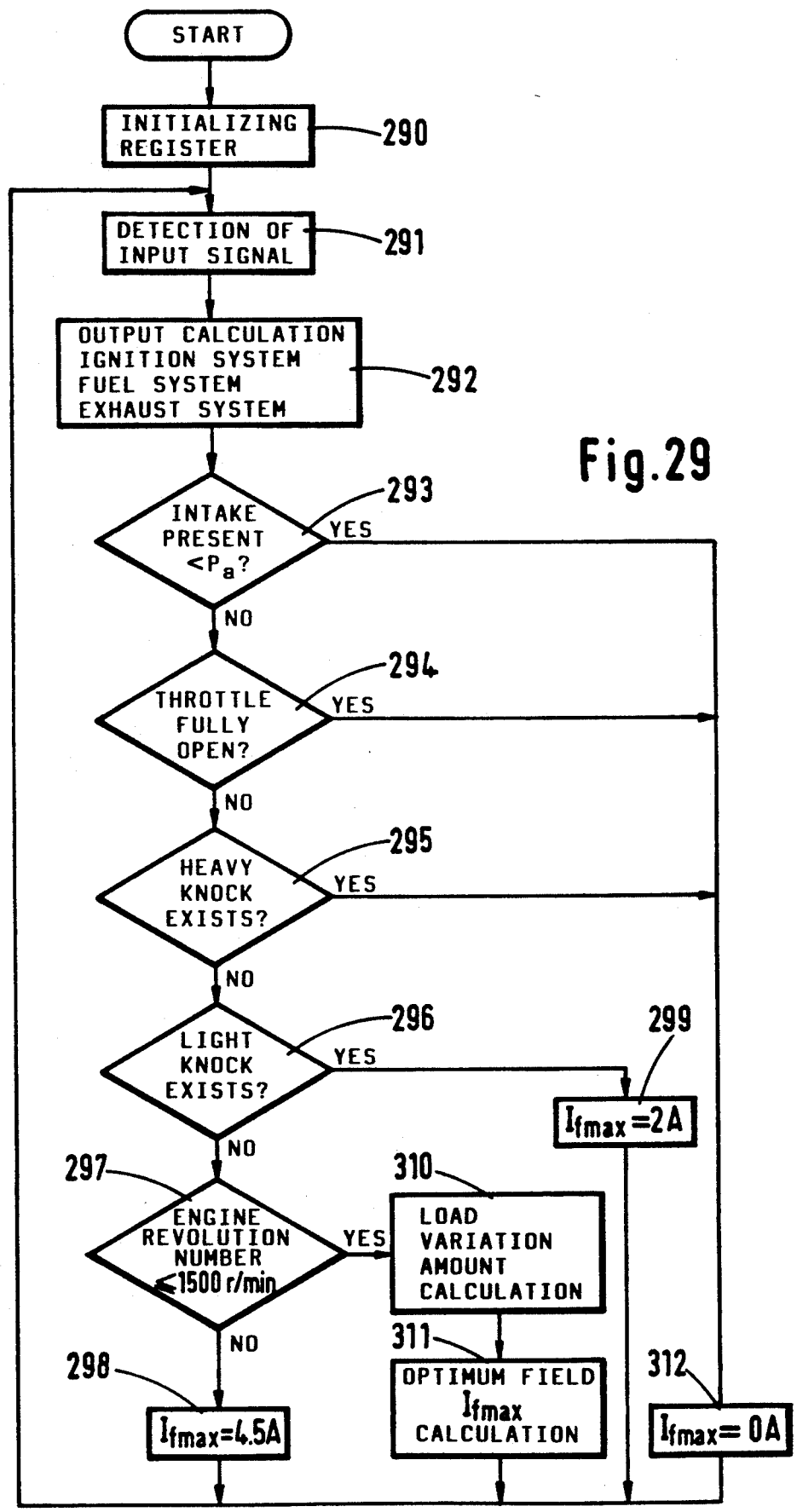
FIG. 29 is a control flow chart of the device shown in FIGS. 27 and 28.

The relationship of the generator with the engine control elements will now be described with reference to the block diagram shown in FIG. 28 and the control flow chart shown in FIG. 29.

A microcomputer 280 of which the initial setting of the input register 281 is completed at step 290 detects input signals at step 291 such as engine revolution number 282a, manifold intake pressure 282b, knock signals 282c, throttle opening angle signal 282d and battery load current 282e through an A-D converter 283 and inputs into a random access memory RAM 284 via microprocessor 285.

The load current may be applied through the input register 281 while detecting the particular load which is switched on by an ON/OFF switch therefor (not shown).

At step 292, control signals for the ignition system, control signals for fuel system and control signals for exhaust system are calculated and outputted based on the input signals and in accordance with the calculation flow stored in a read only memory ROM 286.

At step 293 the size of the engine load in terms of the engine manifold intake pressure is determined and if the intake pressure is judged to be lower than a predetermined pressure Pa, the maximum value $I_{fmax}$ of the command value is set at zero so that the generator does not become a load torque to the engine, and the field current becomes zero.

When the manifold intake pressure is judged to be higher than the predetermined value Pa, the engine is judged to be in a normal load operation and the process proceeds to the next step 294.

At step 294, whether the opening angle of the throttle is fully open or not is detected. If judged to be fully open, an acceleration condition is judged, and the maximum value $I_{fmax}$ of the current command value $I_{fo}$ is set at zero so that the generator is arranged not to become a load to the engine.

When the throttle is not fully open, the normal running condition is judged and the process proceeds to the next step 295.

At step 295, a heavy knock condition is determined with knock signals; when a heavy knock condition is determined, the maximum value $I_{fmax}$ of the current command value is set at zero to ensure the generator is not a load to the engine.

When the condition is not a heavy knock condition, the process proceeds to the next step 296.

At step 296, whether or not a light knock condition is determined from knock signals; when a light knock condition is determined, the maximum value $I_{fmax}$ of the current Command value $I_{fo}$ is set at 2A to suppress the power generation capability at a low level thereby reducing the load torque caused by the generator to the engine.

When the conditn is below the light knock detection threshold, no knock condition is judged, and the process proceeds to the next step 297.

At step 297, whether or not the engine revolution number is below 1500 r.p.m. is determined; when the revolution number is determined below 1500 r.p.m., the size of the electric load is calculated at step 310 by, for example, determining the number of electrical loads having switches therefor which are turned ON and based upon this the optimum current command value $I_{fmax}$ calculated at step 311 and outputted.

When the revolution number is more than 1500 r.p.m., the maximum value $I_{fmax}$ of the current command value is set at a maximum allowable current value of 4.5 A at step 298 and is controlled so as to obtain a maximum output.

Figure 27:
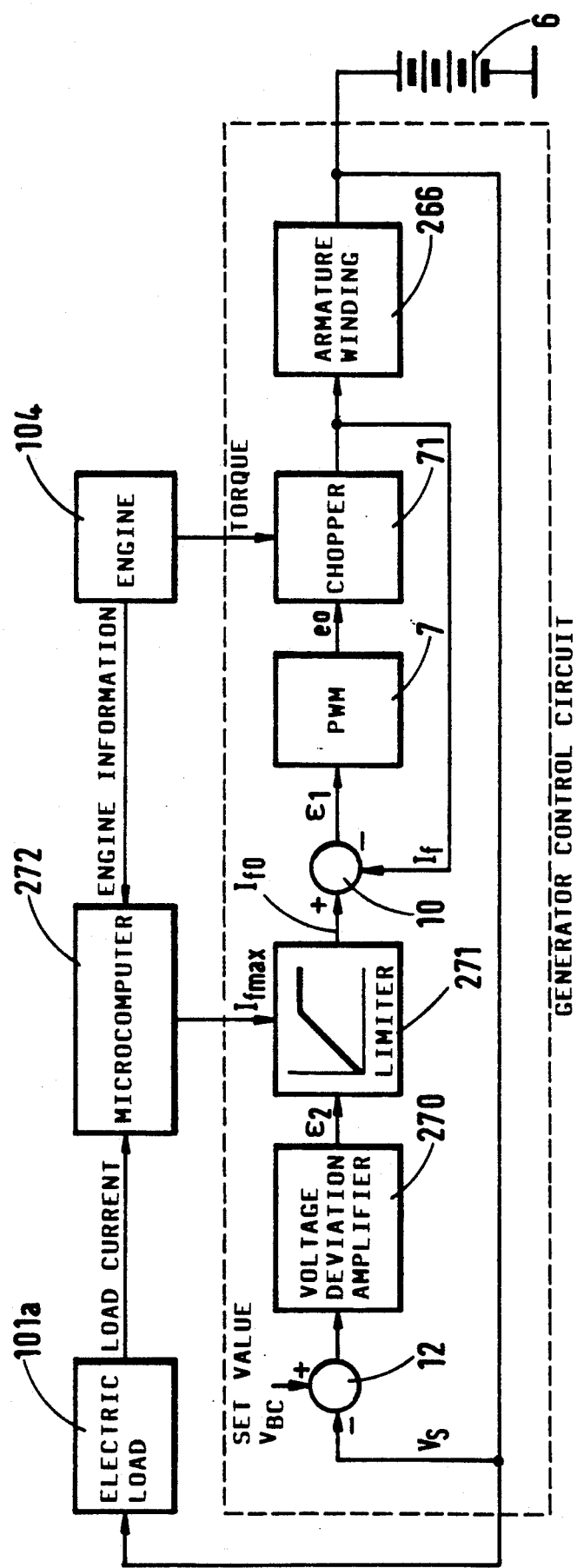
FIG. 27 is a functional block diagram showing another embodiment of the control device of this invention in a generator used for vehicles using a microcomputer.

The thus determined maximum value $I_{fmax}$ of the current command value is inputted to the limiter 271 of the generator control circuit of FIG. 27 through a D-A converter 287.

It is possible to output the maximum value of the field current command value $I_{fmax}$ from the output register 288 of the microcomputer as a duty signal. In this instance, the field current command value and $DI_{fmax}$ is supplied to the field winding chopper circuit 71 as a duty control signal.

In the present invention preferred feature as described above, since the field current is controlled to be modified in response to the engine manifold intake pressure, when a load suddenly acts on the engine such as when the vehicle is climbing a hill the generator is adapted so as not to be a load to the engine so that the possibility of engine stoppage caused thereby is prevented and greater power output is thus available to be given to the vehicle transmission.

Further, even when the throttle is fully open, the power generation off control is activated so the engine output is fully utilized during acceleration to enhance the acceleration performance.

Additionally, since the power generation capability of the generator may be controlled in accordance with the knocking condition of the engine, when the engine power output is reduced due to retarding the ignition timing (which occurs during knock generation) the driving torque required for the generator is decreased so that problems such as engine stoppage due to output reduction and the advancement of the knocking condition are prevented.

Moreover, when the number of engine revolutions is low, an optimum field current control is performed in response to the load current.

In this invention, the variation of the field current due to warm or cool temperature differences of the field winding may be prevented by controlling the field current of the generator. Accordingly, unlike the conventional generator which was designed to have a design margin to allow for the current variation caused by temperature variations between cool and warm, the present generator need not estimate the variation so that a generator using this invention having the same size field winding as the conventional generator will achieve an output power increase. Conversely, the present generator having the same output as a conventional generator, is reduced in size. Further, the rating of the semiconductor elements in the chopper may be reduced in the present generator vis-a-vis a generator of the prior art having the same power output. Still further, when the load is suddenly changed, the step-up operation of the field current is controlled by an external signal, and a sudden load variation to the automobile engine prevented. That is, the field current value can be freely and continuously changed from a minimum value to a maximum value in response to the external signals. Accordingly, reduction and stoppage of power generation by the present generator during engine control operations is readily realized.

Further, when the amount of power generated is small during a low speed rotation, the field current is limited to a necessary minimum amount. It is possible to render the field current into a so-called initial excitation condition to reduce the discharge amount of the battery as well as to suppress the field loss.

Further, through the current detection of the present invention, the continuous field current can be determined by the intermittent current from the chopper without directly detecting the field current thereby avoiding the necessity for an expensive isolation type current detector. Moreover, the invention has the advantage that the field current is continuously detectable from a minimum value to a maximum value.

It will now be understood that the present invention is advantageously adapted to obtain a command value of current $I_{fo}$ (target field current) to be supplied to the field winding of a generator with a signal in response to a deviation voltage signal $\epsilon_2$ and a signal in response to an actual current flowing through the field winding $I_{ff}$, and to supply a current to the field winding based upon this command value; therefore, when the output of the generator is in a broad range and providing an optimum output in response to the load requirement, the field current is stabilised to enable an optimum output control of the generator.

Further, in the present invention, relating to the detection of the field current, the necessity to employ a current transformer is eliminated, so that a control device for the generator having reduced cost and suitable for forming in an IC is obtained.

It is to be understood that the invention has been described with reference to exemplary embodiments, and modifications may be made without departing from the spirit and scope of the invention as defined in the appended claims.

We claim:

1. A control apparatus for an electric generator having an armature winding and afield winding conformed for drive by rotation of an engine of a vehicle, said apparatus including means for detecting the actual voltage of a battery employed in the vehicle; means for comparing the actual voltage with a predetermined voltage; converting means for converting the output of said comparing means to a first current command value; means responsive to a parameter affecting a field current of said field winding for generating at least one further current command value; a chopper for controlling the field current of said first winding; means for detecting the actual current flowing through the field winding; means for selecting between said first and said further current command value to provide a final current command value; comparator means for generating a signal indicative of a deviation between said final current command value and said actual current flowing through the field winding and for applying the deviation signal t pulse width control means for controlling the duty of said chopper to render said deviation to be substantially zero, so that a current feedback loop from the field winding to said pulse width control means and a voltage feedback loop from the battery to said comparing means are formed.

2. A control apparatus as claimed in claim 1 wherein said responsive means comprises: means for detecting the rotational speed of said engine; means for providing a second current command value so as to reduce the field current to a minimum necessary value when the number of engine revolution detected by said rotational speed detecting means fall below a predetermined value $N_{GO}$; means for providing a third current command value which is gradually increased up to a target current command value; means for detecting the temperature of a semiconductor switching element used for said chopper; means for providing a fourth current command value which is decreased in response to said temperature detecting means detecting an increase in the temperature of said semiconductor switching element used for said chopper when the temperature of said semiconductor switching element rises above a predetermined temperature; and said means for selecting selects one of the first to fourth current command values and supplies the same to said pulse width control means.

3. An control apparatus as claimed in claim 1 wherein power generation control means are provided to reduce the driving torque demanded by the generator during the time of vehicle load increase, such as acceleration.

4. A control apparatus as claimed in claim 3 wherein said power generation control means includes a throttle opening degree detector and a controllable switch adapted to be controlled in dependence upon the opening of the throttle and which controllable switch is adapted to transmit a control signal to the chopper to cut off the field current through said field winding.

5. A control apparatus as claimed in claim 1 wherein there is provided an output current control circuit adapted to apply a signal to a pulse width modulator adapted to control the duty cycle of said chopper such that the chopper duty cycle is varied to suppress torque required to drive the generator at times of acceleration of said vehicle.

6. A control apparatus as claimed in claim 1 wherein there is provided a load response control circuit including an electrical load detector adapted to determine the current required by the load, and means for applying the current command value as a stepwise fashion signal.

7. A control apparatus as claimed in claim 1 wherein the maximum current value in the field winding is determined by means for determining at least one vehicle engine operating parameter and means for determining the electric load connected to a battery, the output of the generator being controlled by controlling the field winding current so that the actual voltage of the battery is maintained within a predetermined voltage range.

8. A control apparatus as claimed in claim 1 including a throttle of the vehicle, detector means for detecting the amount of opening of the throttle connected to means for supplying a signal to control the generator to render the output of said generator substantially zero when the throttle is fully open.

9. A control apparatus as claimed in claim 1 wherein means are provided for sensing and detecting when the number of revolutions of the engine are below a predetermined number and in dependence thereon to apply a signal to the generator such that power generation is reduced as the electric load increases on the generator.

10. A control apparatus as claimed in claim 1 further comprising means for sensing and detecting when the engine revolutions decrease below a predetermined revolution speed connected to means for generating an alarm when the engine revolution speed is detected to decrease below said predetermined revolution speed.

11. A control apparatus as claimed in claim 10 wherein said means for generating an alarm includes a lamp which is adapted to flicker at different rates in dependence upon different causes for the alarm.

12. A control apparatus for an electric generator having an armature winding and afield winding conformed for drive by rotation of an engine of a vehicle comprising: a chopper for controlling the field current of said field winding; a knock detector for generating a current command value in dependence upon knocking of said engine; pulse width control means for controlling the duty of said chopper in response to said current command value; means for measuring the actual current flowing through the field winding; means for determining a deviation between said current command value governing the duty of said chopper and said actual current flowing through the field winding and for controlling the duty of said chopper to render said deviation so as to be substantially zero; whereby the duty of said chopper is controlled to reduce the torque required to drive the field winding when knocking is detected.

13. A control apparatus as claimed in claim 12 wherein during a heavy knock signal output from said knock detector, the field current is cut off to stop power generation.

14. A control apparatus for an electric generator having an armature winding and a field winding conformed for drive by rotation of an engine of a vehicle, comprising: means for determining an operating condition of said engine; means for generating a current command value in dependence upon an output of said operating condition determining means; a chopper for controlling the field current of said field winding; pulse width control means for controlling the duty of said chopper; means for measuring the actual current flowing through the field winding; means for determining and controlling a deviation between said current command value and said actual current flowing through the field winding so as to be substantially zero; and a storage means connected in circuit with said chopper for storing the chopper current value $I_{ch}$ flowing through the field winding when said chopper is ON and for applying said NO state chopper current $I_{ch}$ value as a signal indicative of the actual current to said deviation controlling means when the chopper is initially turned OFF.

15. A control apparatus for an electric generator having an armature winding and a field winding adapted to be driven by an engine of a vehicle, comprising: means for determining an operation condition of said engine; means for generating a current command value in dependence upon an output of said operating condition determining means; said operating condition determining means comprising means for detecting the intake manifold pressure of the vehicle, and output of said detecting means being connected to an input of means for determining if said pressure is lower than a predetermined value, said lower pressure determining means providing said output of said operating condition determining means to said generating means; means for measuring the actual current flowing through the field winding; means for determining and controlling a deviation between said current command value and said actual current flowing through the field winding so as to be substantially zero; a chopper for controlling the field current of said field winding; pulse width control means connected to receive an output signal from said deviation determining and controlling means so as to control the duty of said chopper; whereby said current command value is substantially zero when the intake manifold pressure is detected by said detecting means to be lower than said predetermined value.

16. In a control apparatus for an electric generator including field current control means for controlling the field current through a field winding of the generator, means for detecting a battery voltage, means for providing a predetermined voltage, a comparator connected to said battery voltage detecting means and said predetermined voltage means and to provide an output signal indicative of a deviation therebetween, said field winding being connected to charge said battery in dependence upon said output signal of said comparator such that the battery voltage is maintained at the predetermined voltage, the improvement wherein the field current control means comprises field current signal detecting means for producing a signal in response to current flowing through said field winding, current command value generating means for providing a first field winding current command value at said predetermined voltage, said current command value generating means being connected to receive said output of said comparator, means responsive to a parameter affecting said field current for generating at least one further current command value, and means for selecting between said first and said further current command value to provide a final current command value, deviation determining means connected to provide an output signal in dependence upon deviation between said final current command value and said signal produced by said field current signal detecting means which output signal is connected to be applied to a field winding current supply means, said field winding current supply means being connected to provide a predetermined current to said field winding.

17. A control apparatus as claimed in claim 16 wherein said field winding current supply means comprises a pulse signal generation means for generating a pulse signal having an on-off duty cycle which changes in response to the current command value from said field winding current command value generation means.

18. A control apparatus as claimed in claim 17 wherein the pulse signal generation means comprises a pulse width modulator connected to control a semiconductor witching means, the pulse width modulation means providing on-off duty pulses to turn the switching means on-off, said duty cycle being connected to be controlled in dependence upon output signals derived from means detecting operating conditions of the vehicle.

19. A control apparatus as claimed in claim 16 wherein the field current command value generation means include current command target value generation means for obtaining a target value for the current command value and current command value renewing means for adjusting the current command value toward said target value in a stepwise fashion.

20. In a control apparatus for an electric generator including field current control means for controlling the field current through a field winding of the generator, means for detecting a battery voltage, means for providing a predetermined voltage, said field winding being connected in circuit with said battery comparison means for indicating a deviation voltage between a detected battery voltage of the battery voltage detecting means and an output of said predetermined voltage means, an output of said comparison means being connected to said field current control means such that the battery voltage is maintained at the predetermined voltage, the improvement wherein the field current control means comprises field current signal detecting means for producing a signal in response to current flowing through said field winding, current command value generating means for providing a field winding current command value that is necessary for maintaining said battery voltage at said predetermined voltage, deviation determining means for providing an output signal in dependence upon deviation between said signal from the field current signal detecting means and the field winding current command value which output signal is applied to a field winding current supply means, said field current supply means providing a predetermined current to said field winding, said field winding current supply means comprising a pulse signal generation means for generating a pulse signal having an on-off duty cycle which changes in response to the said output from said deviation determining means, said pulse signal generation means comprising a pulse width modulator connected to control a semiconductor switching means, the pulse width modulation means providing on-off duty pulses to turn the switching means on-off, said duty cycle, being controllable in dependence upon operating conditions, detecting and memory means connected in circuit with said semiconductor switching means for detecting the state of the semiconductor switching means and for storing a field winding current value immediately before the semiconductor switching means is turned OFF and wherein said field winding current command value generation means assumes the current value stored in said detecting and memory means as an actual field winding current value during the OFF condition of said semiconductor switching means to thereby generate said current command value based upon the current value stored in said detecting and memory means and said deviation voltage.

21. A control apparatus for an electric generator having an armature winding and a field winding adapted to be driven by an engine of a vehicle comprising: means for detecting the actual voltage of a battery employed in the vehicle; means for comparing the actual voltage with a predetermined voltage, means for converting the output of said comparing means to a current command value; comparator means for receiving as inputs said current command value and an output of a means for detecting the actual current flowing through the field winding, said comparator means being connected to means for controlling the field current of said field winding in response to said comparator means output so as to render the deviation between the current command value and the actual current flowing through the field winding to be substantially zero, whereby a current feedback loop from the field winding to said controlling means and a voltage feedback loop from the battery to said comparing means are formed.

22. An electric generator having an armature winding and a field winding adapted to be driven by an engine of a vehicle including: means for detecting the actual voltage of a battery employed in the vehicle; means for comparing the actual voltage with a predetermined voltage, means for converting the output of said comparing means to a current command value; chopper for controlling the field current of said field winding; comparator means for receiving as inputs said current command value and an output of a means for detecting the actual current flowing through the field winding, said comparator means being connected to pulse width control means for controlling the duty of a chopper for controlling the field current of said field winding in response to said comparator means output so as to render deviation between the current command value determining the duty of said chopper and the actual current flowing through the field winding to be substantially zero, so that a current feedback loop from the field winding to said pulse width control means and a voltage feedback loop from the battery to said comparing means are formed.

23. A control apparatus for an electric generator having an armature winding and a field winding adapted to be driven by an engine of a vehicle comprising:

means for detecting the intake manifold pressure of the engine connected to means for determining if said intake pressure is lower than a predetermined value;

means for generating a current command value connected to receive output signals from said determining means;

means for measuring the actual current flowing through the field winding;

means for determining a deviation between said current command value and said actual current flowing through the field winding and to supply a signal indicative thereof to means for controlling said deviation so as to render said deviation substantially zero; and pulse width control means connected to said deviation controlling means for controlling the duty of a chopper, said chopper being for controlling the field current of said field winding;

whereby said current command value is substantially zero when the intake manifold pressure is lower than said predetermined value.

* * * * *